US012792858B2

(12) United States Patent
Kawashima

(10) Patent No.: US 12,792,858 B2
(45) Date of Patent: Nov. 10, 2026

(54) OPTICAL INFORMATION READING METHOD, OPTICAL INFORMATION READING DEVICE, AND STORAGE MEDIUM

(71) Applicant: OPTOELECTRONICS CO., LTD., Warabi (JP)

(72) Inventor: Yasutake Kawashima, Warabi (JP)

(73) Assignee: OPTOELECTRONICS CO., LTD., Warabi (JP)

(*) Notice: Subject to any disclaimer, the term of this patent is extended or adjusted under 35 U.S.C. 154(b) by 0 days.

(21) Appl. No.: 19/374,041

(22) Filed: Oct. 30, 2025

(65) Prior Publication Data

US 2026/0187394 A1 Jul. 2, 2026

(30) Foreign Application Priority Data

Dec. 27, 2024 (JP) ................................ 2024-232263

(51) Int. Cl.

*G06K 7/14* (2006.01)
*G06K 7/10* (2006.01)
(Continued)

(52) U.S. Cl.

CPC ......... *G06K 7/146* (2013.01); *G06K 7/10732* (2013.01); *G06K 7/10752* (2013.01);
(Continued)

(58) Field of Classification Search

CPC .. G06K 7/1404; G06K 7/1408; G06K 7/1413; G06K 7/1417; G06K 7/146;
(Continued)

(56) References Cited

U.S. PATENT DOCUMENTS 10,127,422 B1 * 11/2018 Joußen ................. G06K 7/1091
11,922,271 B1 * 3/2024 Biasini ................... H04N 23/76
(Continued)

FOREIGN PATENT DOCUMENTS

EP 3482560 B1 11/2019
JP H05324898 A 12/1993
(Continued)

OTHER PUBLICATIONS

Extended European Search Report issued in European Appln. No. 25212268.4, mailed Mar. 25, 2026.
(Continued)

*Primary Examiner* — Laura A Gudorf
(74) *Attorney, Agent, or Firm* — ROSSI, KIMMS & McDOWELL LLP

(57) ABSTRACT

In a case where an image is periodically captured and the optical information contained in the image is read by analyzing the image, an amount of movement of the imager within a certain time range is estimated based on images captured in the certain time range, and an imaging condition is adjusted by an imaging adjustment process based on pixel values of pixels in the captured images so that the brightness of images to be obtained in subsequent imaging reaches a predetermined target level. When reading of the optical information fails even though it can be determined that, based on the estimated amount of movement, aiming has been established, and the imaging adjustment process is performed again, the target level is changed to a higher level.

25 Claims, 17 Drawing Sheets

(51) Int. Cl.

| | |
|---|---|
| ***G06T 7/00*** | (2017.01) |
| ***G06T 7/246*** | (2017.01) |
| ***G06T 7/73*** | (2017.01) |
| ***H04N 23/61*** | (2023.01) |
| ***H04N 23/73*** | (2023.01) |

(52) U.S. Cl.

CPC ............ *G06K 7/1413* (2013.01); *G06T 7/246* (2017.01); *G06T 7/248* (2017.01); *G06T 7/73* (2017.01); *G06T 7/97* (2017.01); *H04N 23/61* (2023.01); *H04N 23/73* (2023.01); *G06K 7/1417* (2013.01); *G06T 2207/10016* (2013.01); *G06T 2207/30241* (2013.01)

(58) Field of Classification Search

CPC ............. G06K 7/1465; G06K 7/10752; G06K 7/10762; H04N 23/70; H04N 23/76

See application file for complete search history.

(56) References Cited

U.S. PATENT DOCUMENTS

| | | | |
|---|---|---|---|
| 11,960,960 | B2 | 4/2024 | Brock et al. |
| 12,164,997 | B1 | 12/2024 | Lei et al. |
| 2005/0236488 | A1 | 10/2005 | Kricorissian |
| 2013/0126616 | A1 | 5/2013 | Zolotov |
| 2018/0130230 | A1 | 5/2018 | Nakajima |
| 2026/0187818 | A1 | 7/2026 | Kawashima |
| 2026/0187821 | A1 | 7/2026 | Kawashima |
| 2026/0187833 | A1 | 7/2026 | Kawashima |
| 2026/0187846 | A1 | 7/2026 | Kawashima |
| 2026/0189778 | A1 | 7/2026 | Kawashima |

FOREIGN PATENT DOCUMENTS

| | | | |
|---|---|---|---|
| JP | 3632578 | B2 | 3/2005 |
| JP | 2006031603 | A | 2/2006 |
| JP | 3918713 | B2 | 5/2007 |
| JP | 3944997 | B2 | 7/2007 |
| JP | 4175223 | B2 | 11/2008 |
| JP | 5381928 | B2 | 1/2014 |
| JP | 5505332 | B2 | 5/2014 |
| JP | 2014081711 | A | 5/2014 |
| JP | 2015072597 | A | 4/2015 |
| JP | 2016170555 | A | 9/2016 |
| JP | 6065719 | B2 | 1/2017 |
| JP | 6263932 | B2 | 1/2018 |
| JP | 6638614 | B2 | 1/2020 |
| JP | 2021141371 | A | 9/2021 |

OTHER PUBLICATIONS

Extended European Search Report issued in European Appln. No. 25212280.9, mailed Mar. 20, 2026.

Sörös et al. “Fast Blur Removal for Wearable QR Code Scanners”, ISWC, Sep. 2015, pp. 117-124, Japan.

Extended European Search Report issued in European Appln. No. 25212288.2, mailed Mar. 25, 2026.

Extended European Search Report issued in European Appln. No. 25212299.9, mailed Apr. 1, 2026.

Extended European Search Report issued in European Appln. No. 25212306.2, mailed Apr. 29, 2026.

Extended European Search Report issued in European Appln. No. 25212312.0, mailed Apr. 29, 2026.

* cited by examiner

OPTICAL INFORMATION READING METHOD, OPTICAL INFORMATION READING DEVICE, AND STORAGE MEDIUM

FIELD

The present invention relates to an optical information reading method for reading optical information such as code symbols contained in a captured image, an optical information reading device configured to perform such optical information reading, and a non-transitory machine-readable storage medium containing program instructions configured to cause a computer or computers to execute such optical information reading method.

BACKGROUND

Conventionally, optical information reading devices are known in which an image of a read object is captured by an imager such as a camera, and optical information such as code symbols or characters contained in the obtained image is read.

Such optical information reading devices generally start image capturing upon receiving a read start trigger and perform various processes on the obtained image data for reading the optical information.

However, if the operator fails to align the device properly and the optical information to be read is not included in the captured image, or if the operator moves the device during image capturing and the captured image is blurred, the optical information may fail to be read or may be misread.

As a technique for reading control that takes such situations into account, PTL 1 discloses an optical information reading device configured to output a decode result by a decoding part when the number of times that a change amount of a numerical value related to a specific portion of a region occupied by optical information in a captured image is equal to or less than a predetermined value reaches or exceeds a predetermined number.

PTL 2 discloses a barcode reader device configured to automatically perform decoding only when a barcode has stopped at a proper position.

PTL 3 discloses an optical information reading device configured not to perform a decoding process on image data of images captured before a standby period has elapsed after a capture instruction is given.

PTL 4 discloses an optical information reading device configured to compare the total number of both bright and dark patterns constituting a bright-dark pattern sequence in binarized signals captured within a predetermined period between two or more consecutive predetermined periods, and to execute decoding when the comparison result satisfies a predetermined stability condition.

As a conventional art from another perspective, PTL 5 discloses an optical information reading device configured to change a control condition related to reading by a reading means when it is determined that reading of an information code by the reading means has failed and that a state in which the optical information reading device is positioned within a predetermined range has continued for a predetermined period of time.

CITATION LIST

Patent Literature

[PTL 1] Japanese Patent No. 6638614
[PTL 2] Japanese Patent Application Laid-Open Publication No. 1993 (H5)-324898
[PTL 3] Japanese Patent No. 3918713
[PTL 4] Japanese Patent No. 3944997
[PTL 5] Japanese Patent No. 6065719
[PTL 6] Japanese Patent No. 5381928
[PTL 7] Japanese Patent No. 4175223
[PTL 8] Japanese Patent No. 3632578

SUMMARY

The techniques described in PTL1 to PTL4 are considered, in outline, to perform decoding when it is determined that the reading device is in a state in which decodable input such as an image can be expected to be obtained. However, there is room for improvement in the criteria for such determination.

In addition, when various types of read objects, such as paper wrapping, a liquid crystal display screen of a device, or a metal surface, are assumed, analysis processing for determining what the read object is and filter processing performed according to the analysis result may be carried out prior to reading code symbols or characters. In such cases, a certain amount of time may be required from image capturing to reading.

Considering such a situation, for example, if decoding is started only after it is determined that the optical information reading device is in a state where input such as an image from which code symbols or characters can be read is expected to be obtained, the time until a decoding result is obtained may become long.

Meanwhile, with respect to adjustment of image brightness, even if reading fails under some condition, it is not easy to distinguish whether the failure is due to improper brightness, image blur, absence of optical information to be read within the imaging area in the first place, or other factors. Therefore, even if the reading fails, adjusting the imaging condition does not necessarily lead to successful reading.

For example, although one typical cause of read failure is that the image is too dark, if the imaging condition is always adjusted so as to increase the exposure time or lighting time to obtain a brighter image whenever the reading fails, it is conceivable that, in an originally bright environment, the captured image may suffer from halation, which may rather become an obstacle to reading.

The present invention has been made in view of such circumstances, and an object thereof is to enable, when analyzing a captured image to read optical information contained in the image, appropriate adjustment of the imaging condition with a reduced number of trials regardless of the environment in which the information to be read is placed.

A first aspect of the present invention provides the following optical information reading method. An object thereof is, when reading optical information contained in the image by analyzing the captured image, to shorten the time from successful capturing of an image suitable for reading the optical information until a read result is output.

This optical information reading method includes: periodically capturing an image by an imager; analyzing the image captured by the imager to read optical information contained in the image; and estimating, based on images captured within a first time range, an amount of movement of the imager in the first time range.

The method may further include determining whether the estimated amount of movement satisfies a predetermined first upper limit, and, when it is determined that the estimated amount of movement satisfies the first upper limit, performing the analyzing on an image captured within or after the first time range to read the optical information contained in the image.

The performing of the analyzing may be performed such that, when it is determined that the estimated amount of movement satisfies the first upper limit, if the image being analyzed is an image captured within the first time range, continuing the analyzing to read the optical information, and if the image being analyzed is an image captured before the first time range, newly performing the analyzing on the image captured within or after the first time range to read the optical information contained in the image.

In such optical information reading method, the estimation of the amount of movement of the imager may include estimating, based on at least three images captured by the imager within the first time range, a movement range of the imager in the first time range. In this case, the first upper limit may be that the estimated movement range falls within a predetermined allowable range.

Alternatively or additionally, the estimation of the amount of movement of the imager may include estimating, based on at least three images captured by the imager within the first time range, an average amount of movement per frame of the imager in the first time range. In this case, the first upper limit may be that the estimated average amount of movement is a predetermined threshold or less.

Further, the above optical information reading methods may further include: irradiating an aiming light serving as a reference for directing the imager to optical information to be read; detecting a position of the aiming light in the image captured by the imager. The methods may further include adjusting an imaging condition of the imager based on pixel values of pixels in the image captured by the imager.

Further, the adjusting may be such that, when it is determined that the estimated amount of movement satisfies the first upper limit, adjusting the imaging condition of the imager based on pixel values of pixels within a predetermined region in vicinity of the detected position of the aiming light in the image captured by the imager.

Alternatively, the above adjusting may be adjusting an imaging condition of the imager based on pixel values of pixels around the position of the aiming light in the image captured by the imager, and the adjusting may further be such that, when it is determined that the estimated amount of movement satisfies the first upper limit, adjusting the imaging condition of the imager based on pixel values of pixels within a narrower region around the position of the aiming light as compared with a case where it is determined that the estimated amount of movement does not satisfy the first upper limit.

Alternatively, the above optical information reading methods may include adjusting an imaging condition of the imager based on pixel values of pixels within a predetermined reference region in the image captured by the imager, and the adjusting may further be such that, when it is determined that the estimated amount of movement satisfies the first upper limit, adjusting the imaging condition of the imager based on pixel values of pixels within a narrower region in the image as compared with a case where it is determined that the estimated amount of movement does not satisfy the first upper limit.

Further, the above optical information reading methods may further include adjusting an imaging condition of the imager including at least one of exposure time and illumination lighting time. Further, the estimation of the amount of movement of the imager may include estimating, based on images captured by the imager in all or part of the first time range, an amount of movement per frame of the imager. Further, an upper limit of a value of the at least one may be defined based on the estimated amount of movement per frame of the imager.

The methods may further include obtaining a blur amount of an image allowable for the reading of the optical information, and the upper limit of the value of the at least one may be defined based on the estimated amount of movement per frame of the imager and the obtained blur amount.

The invention also provides an optical information reading method including: periodically capturing an image by an imager; estimating, based on at least three images captured by the imager within a first time range, a movement range of the imager in the first time range; and analyzing an image captured by the imager within or after the first time range to read optical information contained in the image, when it is determined that the estimated movement range falls within a predetermined allowable range.

In order to output a read result in a short time, it is also important to adjust the imaging condition so that an image having an appropriate brightness can be obtained, thereby preventing a read failure caused by a defective image. Such adjustment may be performed based on an image obtained by the most recent capturing, so that subsequent capturing is more likely to obtain an image that enables successful reading. However, in some environments where the optical information is read, the brightness in an area where the optical information to be read is present may be significantly different from that in the surrounding area. For example, such a situation occurs when the optical information to be read is printed on paper, and there is a window behind the paper through which bright light enters. In this case, when both the paper and the window are present within the imaging area, the window portion is expected to be captured as extremely bright region with a large area, whereas the portion where the information to be read is located is expected to be captured as dark region due to shadow.

In such a case, adjusting the imaging condition based on the brightness of the entire image may not produce an image suitable for reading. However, if the information to be read is not captured at an appropriate brightness level, it is not easy even to determine where the information to be read is located, even by analyzing the image, and thus it is also difficult to adjust the imaging condition based on the brightness near the information to be read.

A second aspect of the present invention has been made in view of such circumstances, and provides the following optical information reading method. An object thereof is to enable, when analyzing a captured image to read optical information contained in the image, appropriate adjustment of the imaging condition regardless of the environment in which the information to be read is placed.

This optical information reading method includes: periodically capturing an image by an imager; analyzing the image captured by the imager to read optical information contained in the image; and estimating, based on images captured within a first time range, an amount of movement of the imager in the first time range.

The method may further include adjusting an imaging condition of the imager based on pixel values of pixels in the image captured by the imager, such that, when it is determined that the estimated amount of movement satisfies a predetermined first upper limit, the imaging condition of the imager is adjusted based on pixel values of pixels within a narrower region in the image as compared with a case where it is determined that the estimated amount of movement does not satisfy the first upper limit.

The method may further include: irradiating an aiming light serving as a reference for directing the imager to optical information to be read; and detecting a position of the aiming light in the image captured by the imager. The narrower region may be a predetermined region in vicinity of the detected position of the aiming light in the image captured by the imager.

Alternatively, the adjusting of the imaging condition may be adjusting the imaging condition of the imager based on pixel values of pixels around the position of the aiming light in the image captured by the imager, and the adjusting may further be such that, when it is determined that the estimated amount of movement satisfies the predetermined first upper limit, adjusting the imaging condition of the imager based on pixel values of pixels within the narrower region around the position of the aiming light as compared with a case where it is determined that the estimated amount of movement does not satisfy the first upper limit.

Alternatively, the adjusting of the imaging condition may be adjusting the imaging condition of the imager based on pixel values of pixels within a predetermined reference region in the image captured by the imager.

Meanwhile, with respect to adjustment of image brightness, even if reading fails under some condition, it is not easy to distinguish whether the failure is due to improper brightness, image blur, absence of optical information to be read within the imaging area in the first place, or other factors. Therefore, even if the reading fails, adjusting the imaging condition does not necessarily lead to successful reading.

For example, although one typical cause of read failure is that the image is too dark, if the imaging condition is always adjusted so as to increase the exposure time or lighting time to obtain a brighter image whenever the reading fails, it is conceivable that, in an originally bright environment, the captured image may suffer from halation, which may rather become an obstacle to reading.

A third aspect of the present invention has been made in view of such circumstances, and provides the following optical information reading method. An object thereof is to enable, when analyzing a captured image to read optical information contained in the image, appropriate adjustment of the imaging condition with a reduced number of trials regardless of the environment in which the information to be read is placed.

This optical information reading method includes: periodically capturing an image by an imager; analyzing the image captured by the imager to read optical information contained in the image; and estimating, based on images captured within a first time range, an amount of movement of the imager in the first time range.

The method may further include: adjusting an imaging condition of the imager based on pixel values of pixels in the image captured by the imager so that brightness of an image to be obtained in subsequent capturing reaches a predetermined target level; and adjusting the target level to a higher level when the reading of the optical information in the analyzing fails while the estimated amount of movement satisfies a predetermined first upper limit.

In such optical information reading method, the adjusting of the imaging condition may include calculating a brightness index value based on pixel values of pixels in the image captured by the imager, and adjusting the imaging condition of the imager so that the brightness index value of an image to be obtained in subsequent capturing reaches the target level.

Further, the adjusting of the imaging condition may be adjusting at least one of exposure time and illumination lighting time among imaging condition of the imager.

Alternatively, while the estimated amount of movement satisfies the first upper limit, the brightness index value may be defined based on a threshold obtained by classifying pixels sampled from the image captured by the imager into a first class of dark pixels and a second class of bright pixels based on a variance of pixel values of the pixels within each class.

Further, the classification may be performed such that a degree of variance of pixel values of the pixels within each class is minimized.

Alternatively, if the estimated amount of movement satisfies the first upper limit, the brightness index value may be calculated by a first procedure, and if the estimated amount of movement does not satisfy the first upper limit, the brightness index value may be calculated by a second procedure different from the first procedure.

In this case, for an image that allows the optical information to be read, the brightness index value to be obtained by the first procedure may be smaller than the brightness index value to be obtained by the second procedure for the same image.

Further in the above optical information reading methods, the adjusting of the target level may include setting the target level to a predetermined initial value when it is determined that the estimated amount of movement does not satisfy the first upper limit.

Alternatively, in the above optical information reading methods, the adjusting of the target level may include returning the target level to a predetermined initial value when the reading of optical information by the reading fails while the target level is a predetermined upper limit value.

Alternatively, the above optical information reading methods may further include: irradiating an aiming light serving as a reference for directing the imager to optical information to be read; and detecting a position of the aiming light in the image captured by the imager. The adjusting of the imaging condition may be performed such that, when it is determined that the estimated amount of movement satisfies the first upper limit, the imaging condition of the imager is adjusted based on pixel values of pixels within a predetermined region in vicinity of the detected position of the aiming light in the image captured by the imager.

Alternatively, the adjusting of the imaging condition may be performed such that the imaging condition of the imager is adjusted based on pixel values of pixels around the position of the aiming light in the image captured by the imager, and such that, when it is determined that the estimated amount of movement satisfies the first upper limit, the imaging condition of the imager is adjusted based on pixel values of pixels within a narrower region around the position of the aiming light as compared with a case where it is determined that the estimated amount of movement does not satisfy the first upper limit.

Alternatively, in the optical information reading methods, instead of providing the irradiating and the detecting of the aiming light above, the adjusting of the imaging condition may be performed such that the imaging condition of the imager is adjusted based on pixel values of pixels within a predetermined reference region in the image captured by the imager, and such that, when it is determined that the estimated amount of movement satisfies the first upper limit, the imaging condition of the imager is adjusted based on pixel values of pixels within a narrower region in the image as compared with a case where it is determined that the estimated amount of movement does not satisfy the first upper limit.

Meanwhile, with respect to adjustment of image brightness, it is not necessarily sufficient to simply make the image brighter when reading fails because the image is too dark. If an image becomes excessively bright such that even portions of the optical information to be read that have a low light reflectance, such as black objects, are captured too brightly, sufficient contrast cannot be obtained, and reading will fail just as in the case where the image is too dark.

A fourth aspect of the present invention has been made in view of such circumstances, and provides the following optical information reading method. An object thereof is to enable more accurate adjustment of the imaging condition for obtaining an image having brightness suitable for reading, when analyzing a captured image to read optical information contained in the image.

This optical information reading method includes: periodically capturing an image by an imager; and analyzing the image captured by the imager to read optical information contained in the image.

The method may further include: adjusting an imaging condition of the imager so that a brightness index value of an image to be obtained in subsequent capturing reaches a predetermined target level, the brightness index value of the image captured by the imager being calculated based on pixel values of pixels in the image. Further, the brightness index value may be determined based on a threshold obtained by classifying pixels sampled from the image captured by the imager into a first class of dark pixels and a second class of bright pixels based on variance of pixel values of the pixels within each class.

Further, the classification may be performed such that a degree of variance of pixel values of the pixels within each class is minimized.

Alternatively, the classification may be performed such that a within-class variance, which is a weighted average of variances of pixel values of the pixels within each class, weighted by the number of pixels belonging to each class, is minimized.

Further, in each optical information reading method above, the brightness index value may be a value indicating a pixel value brighter than the threshold. Alternatively, the brightness index value may be a value indicating a pixel value brighter than and near the threshold.

Further, the adjusting may be adjusting at least one of exposure time and illumination lighting time among imaging condition of the imager.

Meanwhile, in order to output a read result in a short time, it is also important to adjust the imaging condition so that an image with as little blur as possible can be obtained, thereby preventing read failure due to a defective image. For this purpose, one simple solution is to set a short exposure time. However, there are cases where it is desirable to set a relatively long exposure time, for example, when the surrounding environment is dark and it is necessary to secure a sufficient amount of exposure light, but increasing only the gain of the light receiving element would result in increased noise.

A fifth aspect of the present invention has been made in view of such circumstances, and provides the following optical information reading method. An object thereof is to allow appropriate adjustment of the imaging condition while securing a wide range of selectable exposure times, when analyzing a captured image to read optical information contained in the image.

This optical information reading method includes: periodically capturing an image by an imager; analyzing the image captured by the imager to read optical information contained in the image; and estimating, based on images captured by the imager within a first time range, an amount of movement of the imager per frame.

The method may further include adjusting an imaging condition of the imager, the imaging condition including at least one of exposure time and illumination lighting time. An upper limit of a value of the at least one may be determined based on the estimated amount of movement of the imager per frame.

Such optical information reading method may further include obtaining a blur amount of an image allowable for the reading of the optical information, and the upper limit of the value of the at least one may be defined based on the estimated amount of movement of the imager per frame and the obtained blur amount.

A sixth aspect of the present invention provides the following optical information reading method. An object thereof is, when reading optical information contained in the image by analyzing the captured image, to shorten the time from successful capturing of an image suitable for reading the optical information until a read result is output.

This optical information reading method includes: periodically capturing an image by an imager; analyzing the image captured by the imager to read optical information contained in the image; and estimating, based on the image captured by the imager within a first time range, an amount of movement of the imager within the first time range.

The method may further include: controlling the analyzing such that, when a time corresponding to the first time range has elapsed after a predetermined occurrence, the analyzing is newly performed to read optical information contained in a predetermined image by the imager; and determining whether the estimated amount of movement satisfies a predetermined first upper limit, and, when it is determined that the estimated amount of movement satisfies the first upper limit, preventing the controlling of the analyzing.

In such optical information reading method, the predetermined occurrence may be that a first image that is being analyzed has been captured, and the predetermined image may be a second image captured by the imager after the first image.

Alternatively, the predetermined occurrence may be the start of the analyzing being performed, and the predetermined image may be a latest image captured by the imager.

In addition, each aspect of the present invention described above can be implemented in any manner, such as a device, a system, a computer program, and a storage medium in which the computer program is recorded, in addition to the methods described above.

According to the configuration of the present invention, when reading optical information contained in the image by analyzing the captured image, appropriate adjustment of the imaging condition can be performed with a reduced number of trials regardless of the environment in which the information to be read is placed.

DESCRIPTION OF EMBODIMENTS

Embodiments of the present invention will be described with reference to the drawings.

Figure 1:
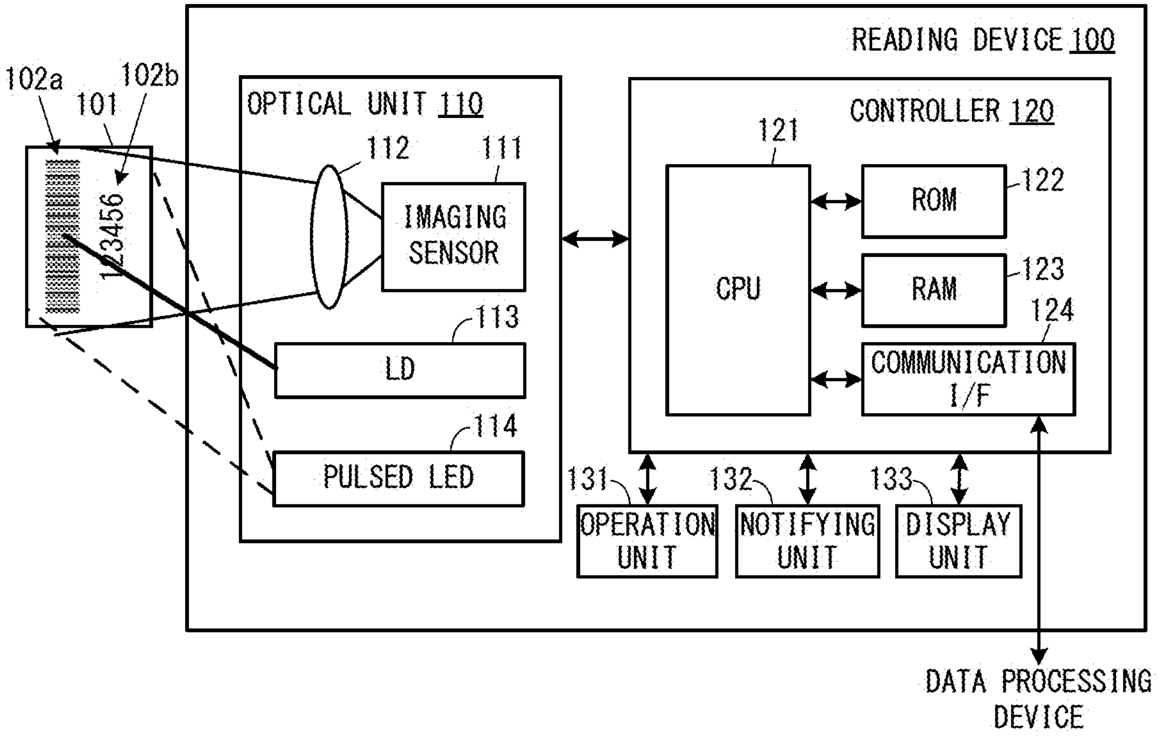
FIG. 1 is a block diagram illustrating a hardware configuration of a reading device 100, which is an embodiment of an optical information reading device according to the present invention.

FIG. 1 is a block diagram illustrating a hardware configuration of a reading device 100, which is an embodiment of an optical information reading device according to the present invention.

The reading device 100 shown in FIG. 1 is a device configured to optically read optical information such as a code symbol 102*a* or a character string 102*b* represented by parts having a reflectance different from that of the surrounding area on a read object 101.

The read object 101 may be a recording medium such as paper that statically carries the code symbol 102*a* or the character string 102*b*, or may be a display device that dynamically displays them.

As shown in FIG. 1, the reading device 100 includes an optical unit 110, a controller 120, an operation unit 131, a notifying unit 132, and a display unit 133.

Among these, the optical unit 110 serves as an imager configured to optically capturing an image of the read object 101 and includes an imaging sensor 111, a lens 112, a LD (laser diode) 113, and a pulse LED (light-emitting diode) 114.

The imaging sensor 111 is a light-receiving element configured to capture an image of an imaging object such as the read object 101 and may be implemented, for example, by a CMOS (complementary metal-oxide-semiconductor) imaging sensor. The imaging sensor 111 can generate image data indicating a gradation value of each pixel based on charges accumulated in the respective pixels of the imaging sensor by imaging, and output the image data to the controller 120. In the imaging sensor 111, the pixels are arranged two-dimensionally.

The lens 112 is an optical system configured to form an image of reflected light from an imaging object onto the imaging sensor 111.

The LD 113 is an irradiating part configured to irradiate an aiming light (marker light) indicating the central position of an imaging range of the imaging sensor 111 toward the imaging object, so that an operator can use it as a reference to direct the optical unit 110 (particularly the imaging range of the imaging sensor 111) toward optical information on the read object 101. A step of irradiating this aiming light is referred to as an irradiating step. The shape of the aiming light may be arbitrary, such as circular, rectangular, or cross-shaped. The aiming light may alternatively indicate an appropriate target position or target region other than the central position.

The pulse LED 114 is a light projecting part configured to project illumination light onto the imaging object.

Next, the controller 120 includes a CPU 121, a ROM 122 that stores data such as computer programs to be executed by the CPU 121 and various tables and the like, a RAM 123 used as a work area when the CPU 121 executes various processes, and a communication I/F 124 for communicating with external devices.

The CPU 121 is a processor and controls operation of the entire reading device 100 including the optical unit 110, the operation unit 131, the notifying unit 132, and the display unit 133 by executing computer programs stored in ROM 122 using RAM 123 as a work area, and thereby realizes various functions including those described later with reference to FIG. 2. These functions may include: reading, displaying, externally outputting, or storing optical information contained in image data of an image captured by the imaging sensor 111; estimating a movement state of the imaging sensor 111; controlling processing relating to reading of optical information based on a result of the estimation; and adjusting imaging condition in the optical unit 110.

The communication I/F 124 is an interface configured to communicate with various external devices, such as a data processing device that uses the result of identification of the character string 102.

The operation unit 131 is an operation part including a button, a trigger and the like configured to accept operations by the operator. The notifying unit 132 is a hardware corresponding to a notifying part configured to perform various notifications to the operator. Conceivable concrete notification methods include, but not limited to, display of messages or data by a display device, lighting or blinking of a lamp, output of sounds by a speaker, and so on. The display unit 133 is a display part configured to display content of optical information read by the reading device 100, information related to an operational state of the reading device 100, and the like. The display 133 unit can be constituted by a liquid crystal display device or the like. The notifying unit 132 and the display unit 133 may be common hardware.

When the reading device 100 is automatically operated under control from an external device or autonomous control, the operation unit 131, the notifying unit 132, and the display unit 133 need not be provided.

The reading device 100 described above can be configured as, for example, a hand-held or stationary code symbol reading device with a character reading function, but is not limited thereto. A general-purpose computer such as a smartphone or a personal computer may be used as all or a part of the hardware.

Characteristic points of the reading device 100 described above include estimating a movement state of the imaging sensor 111, controlling processes relating to reading of optical information based on a result of the estimation, and adjusting imaging condition in the optical unit 110. These points will be described hereinafter.

First, functions related to reading of optical information provided in the reading device 100 will be described.

Figure 2:
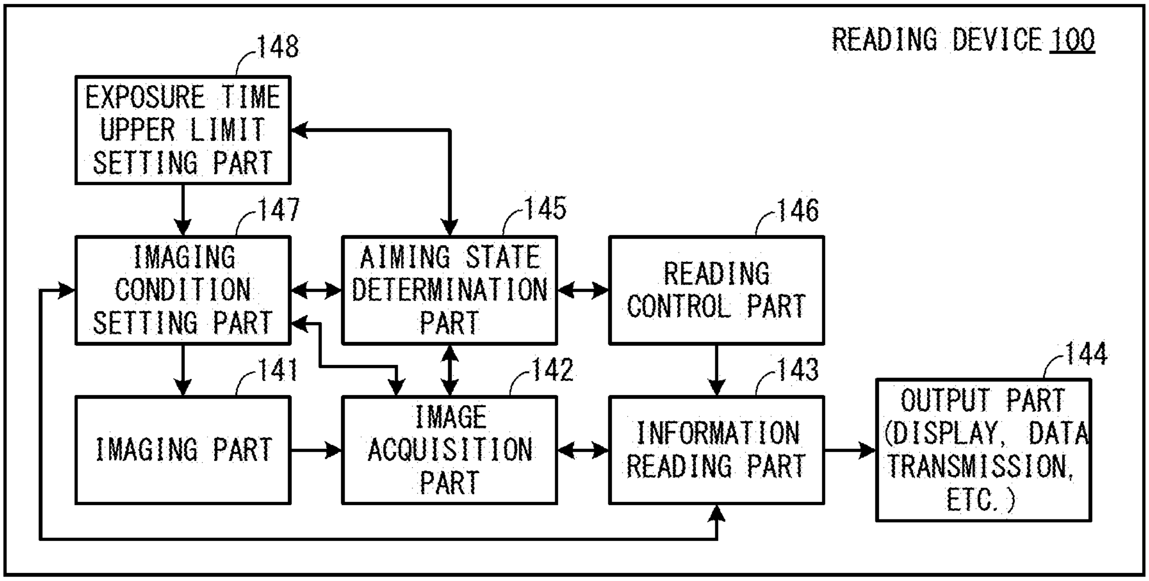
FIG. 2 is a functional block diagram illustrating a configuration of functions included in the reading device 100 shown in FIG. 1.

FIG. 2 is a functional block diagram illustrating a configuration of these functions.

As shown in FIG. 2, the reading device 100 includes functions of an imaging part 141, an image acquisition part 142, an information reading part 143, an output part 144, an aiming state determination part 145, a reading control part 146, an imaging condition setting part 147, and an exposure time upper limit setting part 148. In the embodiment described here, the functions of these parts are implemented by the CPU 121 controlling various components of the reading device 100, including the optical unit 110, through execution of software. However, some or all of the functions may alternatively be implemented by dedicated control circuitry.

As shown in FIG. 2, the imaging part 141 has a function of controlling the optical unit 110 to perform image capturing periodically and supplying image data obtained by capturing in each frame (imaging cycle period) to the image acquisition part 142. That is, the imaging part 141 also functions as an imaging control part that executes an imaging control step. The imaging condition is defined by the imaging condition setting part 147.

The image acquisition part 142 has a function of storing the image data obtained by the imaging part 141 so that it can be referred to by the information reading part 143, the aiming state determining part 145, and the imaging condition setting part 147.

The information reading part 143 has a function of acquiring image data from the image acquisition part 142 and performing processes such as object extraction and decoding to read optical information contained in an image indicated by the image data, which is a function of a reading part. The processes actually performed vary depending on the type of optical information to be read and the environment in which the optical information is expected to be present.

That is, for example, when characters are assumed as the optical information, the information reading part 143 may perform character recognition processing. In addition, when the optical information is expected to be in an environment where reading is difficult due to smearing or fading, background patterns, or the like, or when the background conditions are expected to vary among, for example, paper, metal surfaces, and displays, the information reading part 143 may perform image analysis processing to identify what the imaged object is, prior to object extraction, decoding, or other processes, and may perform filter processing to process the image based on the result of the analysis so as to facilitate decoding or other subsequent processing.

The specific types of processing to be performed and the order thereof may be selected in accordance with an operation by an operator or a setting automatically made according to certain conditions. The setting of the imaging condition performed by the imaging condition setting part 147 may be carried out in coordination with the processing performed by the information reading part 143.

The output part 144 has a function of outputting, via the communication I/F 124 or the notifying unit 132, a read result such as a character string obtained by the reading performed by the information reading part 143 to an external device such as a data processing apparatus that processes the data, and of notifying the operator of successful reading. The method of notification to the operator may be any method, such as a buzzer or vibration, or the notification may be omitted if it is unnecessary. The output part 144 may also have a function of displaying the read result on the display part 133.

The aiming state determination part 145 has a function of estimating, by acquiring the image data of each frame from the image acquisition part 142 and analyzing them in chronological order, an amount of movement of the imaging sensor 111 within a specific time range, which is a function of an estimating part. The amount of movement to be estimated may include an amount of movement per frame and an amount of movement within a range of multiple frames. The amount of movement to be estimated may include both a scalar amount of movement, expressed for example as a translational or rotational movement amount without considering an intermediate trajectory, and a movement range that takes the intermediate trajectory into account.

If the entire optical unit 110 is a rigid body, the amount of movement of the optical unit 110 may be regarded as the same as the amount of movement of the imaging sensor 111. Likewise, if the entire reading device 100 is a rigid body, the amount of movement of the reading device 100 may be regarded as the same as the amount of movement of the imaging sensor 111.

The reading control part 146 has a function of restarting, when the estimation result of the amount of movement estimated by the aiming state determination part 145 is equal to or less than a predetermined criterion (satisfies a first upper limit), the processing performed by the information reading part 143 as necessary. Conditions for the restarting will be described later with reference to FIG. 4A and FIG. 4B.

The imaging condition setting part 147 has a function of adjusting and supplying to the imaging part 141 the imaging condition of the imaging part 141 based on the content of the image data which has been captured by the imaging and the imaging condition used for the imaging. The imaging condition to be adjusted may include, for example, an exposure time and gain of the imaging sensor 111, or may include an intensity and lighting time of illumination by the pulse LED 114.

The exposure time upper limit setting part 148 has a function of setting an upper limit of the exposure time set by the imaging condition setting part 147. Alternatively, or additionally, the exposure time upper limit setting part 148 may have a function of setting an upper limit of the intensity or lighting time of illumination by the pulse LED 114.

Figure 3:
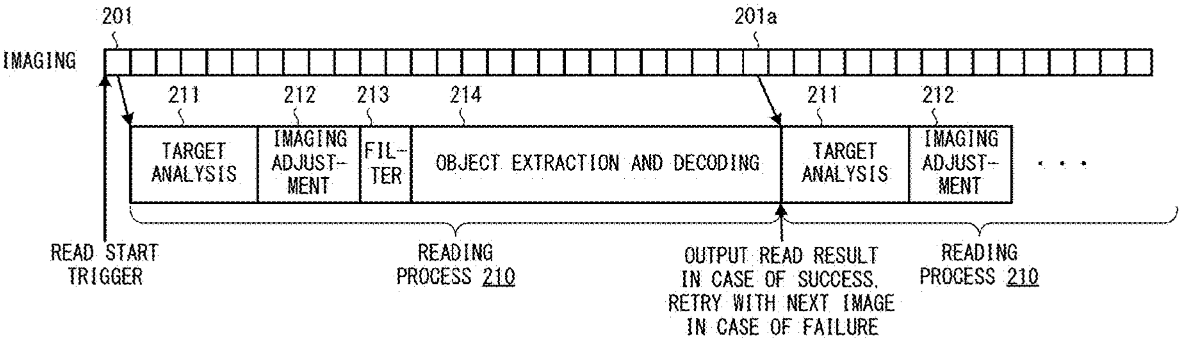
FIG. 3 is a diagram schematically illustrating a basic execution timing of a reading process for reading optical information executed by the reading device 100 shown in FIG. 1, from the time when a read start trigger is detected.

Next, the basic execution timing of the reading process for reading optical information executed by the reading device 100 will be described with reference to FIG. 3. FIG. 3 schematically illustrates the execution timing of this reading process from the time point when a read start trigger is detected. It should be noted that in FIG. 3, the processing performed by the aiming state determination part 145 is omitted for simplicity.

In FIG. 3, the horizontal direction represents the passage of time, and each rectangle aligned in the upper row represents an imaging time for one frame.

When the reading device 100 detects a read start trigger, which instructs the start of reading optical information, such as an operator's operation or reception of a command from an external source, the imaging part 141 starts capturing an image. Once the capturing of one frame is completed, the obtained image data is stored in the image acquisition part 142.

When the reading device 100 detects, in a state where the reading process 210 is not being executed, that image data captured in a new frame 201 has been stored in the image acquisition part 142, the reading process 210 is started using the newly captured image data as a processing target, to analyze the image and read optical information contained therein. In this embodiment, the reading process 210 includes a target analysis process 211, an imaging adjustment process 212, a filter process 213, and an object extraction and decoding process 214 in this order. Among these, the imaging adjustment process 212 corresponds to the function of the imaging condition setting part 147, whereas the other processes correspond to the functions of the information reading part 143.

The target analysis process 211 is a process of performing image analysis to identify what the imaged object is.

The imaging adjustment process 212 is a process of adjusting the imaging condition of the optical unit 110 based on the content of the image data and the imaging condition used for capturing the image. When a change in the imaging condition is required, necessary settings are made to the optical unit 110 during the imaging adjustment process 212, and from the next frame onward, capturing is performed according to the changed settings. However, an image captured according to the changed settings becomes a target of the reading process 210 only when the reading process 210 is started next time.

The filter process 213 is a process of modifying image data in accordance with the identification result in the target analysis process 211 so as to increase the likelihood of success of the object extraction and decoding process 214. The target analysis process 211 may use AI (artificial intelligence), and the algorithm and parameters of the filter process 213 may be determined by the AI.

The order of the imaging adjustment process 212 and the filter process 213 is arbitrary.

The object extraction and decoding process 214 is a process of extracting, from the image indicated by the image data after the filter process 213, an object representing information to be read, such as a code symbol or character, and obtaining the information to be read by performing decoding, character recognition, or the like. The object extraction and decoding process 214 is not necessarily separated into an object extraction part and a decoding part. For example, a process may be employed such that an AI model is pre-trained to identify what a specific-size image (for example, 100×100 pixels) represents, and optical information in the image is identified by inputting the image into the trained model.

When the reading device 100 succeeds in reading information through the object extraction and decoding process 214, it outputs the read result. On the other hand, if the reading fails, the reading device 100 retries the reading process 210. In this case, image data of the latest frame 201*a* (an alphabetic suffix is used to refer to a specific frame 201) that has been captured by the time of the retry is used as a processing target.

The reading device 100 subsequently repeats the reading process 210 in the same manner until either the predetermined number of retries is reached or the reading of information succeeds. When the predetermined number of retries is reached, the reading device 100 notifies the operator of the reading failure and stops the reading process 210.

Figure 4A:
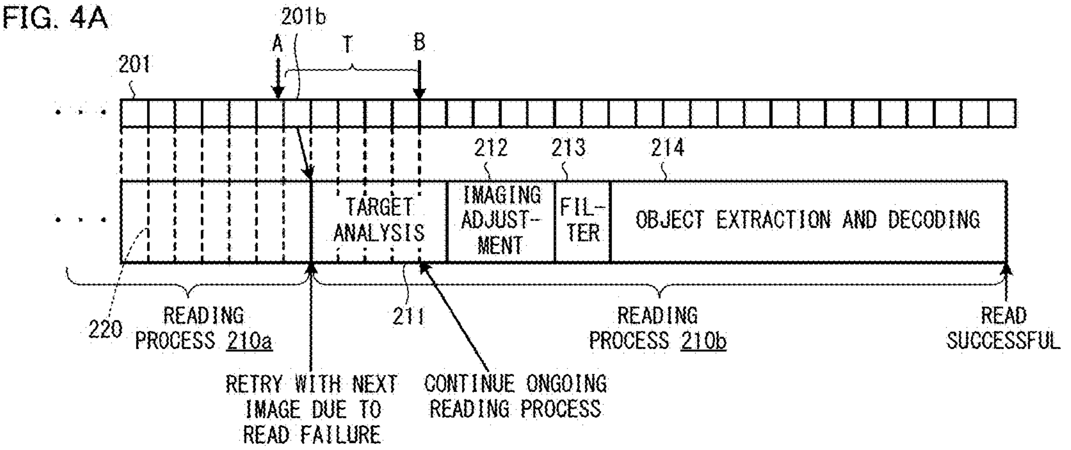
FIG. 4A and FIG. 4B are diagrams schematically illustrating respective examples of execution timing of the reading process for reading optical information executed by the reading device 100, from a time point after elapse of a predetermined time from detection of a read start trigger.
Figure 4B:
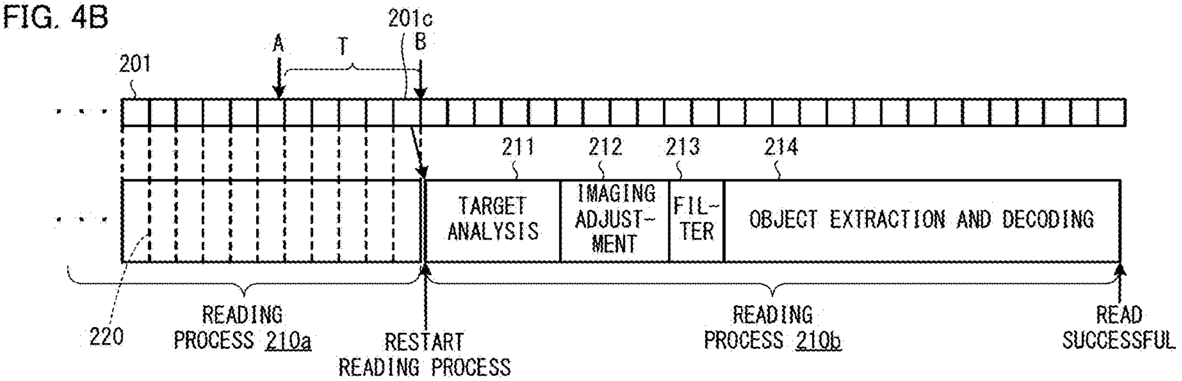

Next, with reference to FIG. 4A and FIG. 4B, execution control of the reading process 210, which is one of the characteristics of this embodiment, will be described, taking into account the process performed by the aiming state determination part 145. FIG. 4A and FIG. 4B schematically illustrate respective examples of execution timing of the reading process executed by the reading device 100 for reading optical information, from a time point after elapse of a predetermined time from detection of a read start trigger.

Although omitted in FIG. 3, the reading device 100 executes an aiming state determination process 220 for estimating the movement state of the imaging sensor 111 at the timing indicated by a dashed line, every time capturing of one frame is completed. This process corresponds to the function of the aiming state determination part 145. The aiming state determination process 220 in this embodiment includes: a process of estimating the amount of movement of the imaging sensor 111 within a certain time range (first time range) based on images captured within the time range, and a process of estimating the amount of movement of the imaging sensor 111 per frame. Details of the process will be described later with reference to FIG. 9 and other figures.

The aiming state determination process 220 can be executed in a very short time of about 1 ms (millisecond), which is much shorter than a frame 201 of capturing or the time required for execution of the reading process 210. The aiming state determination process 220 may be executed in parallel with the reading process 210 in the CPU 121, or may be executed by interrupting the reading process 210.

As a typical usage scenario of the reading device 100, it is conceivable that, when a read start trigger is given by the operator performing a read start operation on the reading device 100, the imaging range of the imaging sensor 111 has not yet faced the optical information of the read object, and that thereafter the operator moves the reading device 100 to face the optical information of the read object and then keep the reading device 100 stationary.

This stationary state is generally a state in which the operator subjectively considers that the reading device 100 can read the optical information of the read object with the current positional relationship, and in reality, the positional relationship between the imaging range and the optical information is often suitable for reading. In other words, this stationary state can be regarded as a state in which the reading device 100 is aimed at the optical information of the read object. However, when the reading device 100 is manually operated by the operator, it is not completely stationary.

In such a usage scenario, the reading device 100 will be kept (substantially) stationary at some timing during repeated executions of the reading process 210 described with reference to FIG. 3. In each of FIG. 4A and FIG. 4B, this timing is indicated by an arrow A.

Then, in the aiming state determination process 220 performed in response to the capturing a few frames later, the estimated movement range of the imaging sensor 111 in a recent predetermined time range T (a period corresponding to a predetermined number of frames) falls within a predetermined allowable range. In other words, the amount of movement obtained as the movement range becomes equal to or less than a predetermined criterion (satisfies a predetermined upper limit). When this condition is satisfied, the reading device 100 determines that the reading device 100 is (substantially) stationary and that aiming at the optical information has been established. In each of FIG. 4A and FIG. 4B, this timing is indicated by an arrow B.

At the timing indicated by arrow B, the reading process 210 is assumed to be in progress, but the stage within the reading process 210 varies depending on the case. The process may have just started the target analysis process 211, or it may be near the end of the object extraction and decoding process 214.

Here, if the image data being processed by the reading process 210 in progress at the timing indicated by arrow B was captured in a frame at least after the timing indicated by arrow A, the capturing was performed in a state where the aiming has been established. Accordingly, it can be regarded as unlikely that the object extraction and decoding process 214 will fail due to factors such as significant image blur or the optical information to be read being omitted from the imaging range. Therefore, by continuing the reading process 210 in progress as is, the likelihood of successful reading can be regarded as relatively high.

However, it is not easy to accurately specify the timing indicated by arrow A.

On the other hand, it is considered that the estimated movement range falls within the predetermined allowable range for the first time in the aiming state determination process 220 in which the predetermined time range T begins near the timing indicated by arrow A. Therefore, in this embodiment, a criterion ("criterion R") is defined such that the processing target of the reading process 210 is the image data captured within the predetermined time range T of the aiming state determination process 220 performed at the timing indicated by arrow B. If the criterion R is satisfied for the reading process 210 in progress at the timing indicated by arrow B, that process is continued as is.

FIG. 4A illustrates an example in which the reading process 210*a* (an alphabetic suffix is used to refer to a specific instance of the reading process 210) has been completed within the predetermined time range T, and, at the timing indicated by arrow B, a next reading process 210*b* is being executed using image data captured in a frame 201*b* within the predetermined time range T as its processing target. In this case, the reading device 100 continues the reading process 210*b* as is.

On the other hand, if the processing target of the reading process 210 being executed at the timing indicated by arrow B is image data captured in a frame prior to the timing indicated by arrow A, the image was captured before aiming was established. Accordingly, it can be regarded as likely that the object extraction and decoding process 214 will fail due to factors such as significant image blur or the optical information to be read being omitted from the imaging range. Therefore, even if the reading process 210 is continued as is, the reading may fail and the processing time may be wasted.

Therefore, in this case, the reading device 100 aborts the reading process 210 in progress at the timing indicated by arrow B and newly starts the reading process 210. In other words, the criterion R described above is used, and when the criterion R is not satisfied, the reading process 210 is newly started. The processing target in the new reading process 210 may be any image data captured within the predetermined time range T, but in view of commonality of processing with the repeated execution of the reading process 210 as assumed in FIG. 3, it is preferable to use the image data of the latest frame as the processing target. Alternatively, the image data captured in a frame in which the estimated amount of movement of the imaging sensor 111 per frame was the smallest may be used as the processing target.

FIG. 4B shows an example in which the reading process 210*a* in progress at the timing indicated by arrow B was started before the predetermined time range T. In this case, the processing target image data was of course captured before the predetermined time range T, and the criterion R is not satisfied. Accordingly, the reading device 100 aborts the reading process 210*a* at the timing indicated by arrow B, and newly starts a reading process 210*b* using, as the processing target, the image data captured in the latest frame 201*c*.

Although the reading process 210*a* is wasted in this case, the time that would be spent waiting for the likely-to-fail reading process 210*a* to finish is eliminated, allowing the new reading process 210*b*, which can be expected to have a relatively higher likelihood of success, to start earlier. Accordingly, the time until a read result can be output can be shortened by an amount corresponding to the eliminated waiting time.

Here, it is also conceivable that, without making a determination based on the criterion R, the reading device 100 always newly starts a reading process 210*b* at the timing indicated by arrow B even in the case of FIG. 4A. Even in this case, the newly started reading process 210*b* can be expected to have the same likelihood of successful reading as in the case of FIG. 4B. However, if this is done, as can be seen from the comparison between FIG. 4A and FIG. 4B, the start timing of the new reading process 210*b* will be later than in the case of FIG. 4A. This is because the time spent on the reading process 210 performed within the predetermined time range T is wasted.

Conversely, by making a determination based on the criterion R and continuing the reading process 210 in progress when the criterion R is satisfied, the time until a read result can be output can be further shortened compared to the case in which a reading process 210*b* is always newly started at the timing indicated by arrow B.

It should be noted that, in either case of FIG. 4A or FIG. 4B, the reading process 210*b* using image data captured in a state where the aim has been established is not guaranteed to succeed. This is because the brightness or contrast of the image may not be suitable for decoding or the like. In this case, a retry is necessary, as in the case described with reference to FIG. 3. However, by advancing the start timing of the reading process 210*b*, the start timing of the retried reading process 210 can also be advanced by the same amount, so even when a retry is necessary, the time until a read result can be output can still be shortened by the amount corresponding to the eliminated waiting time.

In the examples described here, once it is determined that the aim has been established, the aiming state determination process 220 is not performed thereafter, and thus no reading process 210 is newly started during execution of the reading process 210. However, as will be described in a modification example later, this is not essential.

Next, processes executed by the reading apparatus 100 to implement the functions described with reference to FIG. 2 and the operations described with reference to FIG. 3 to FIG. 4B will be described more specifically with reference to flowcharts. The processes described here are processes according to an embodiment of the optical information reading method of the present invention.

Figure 5:
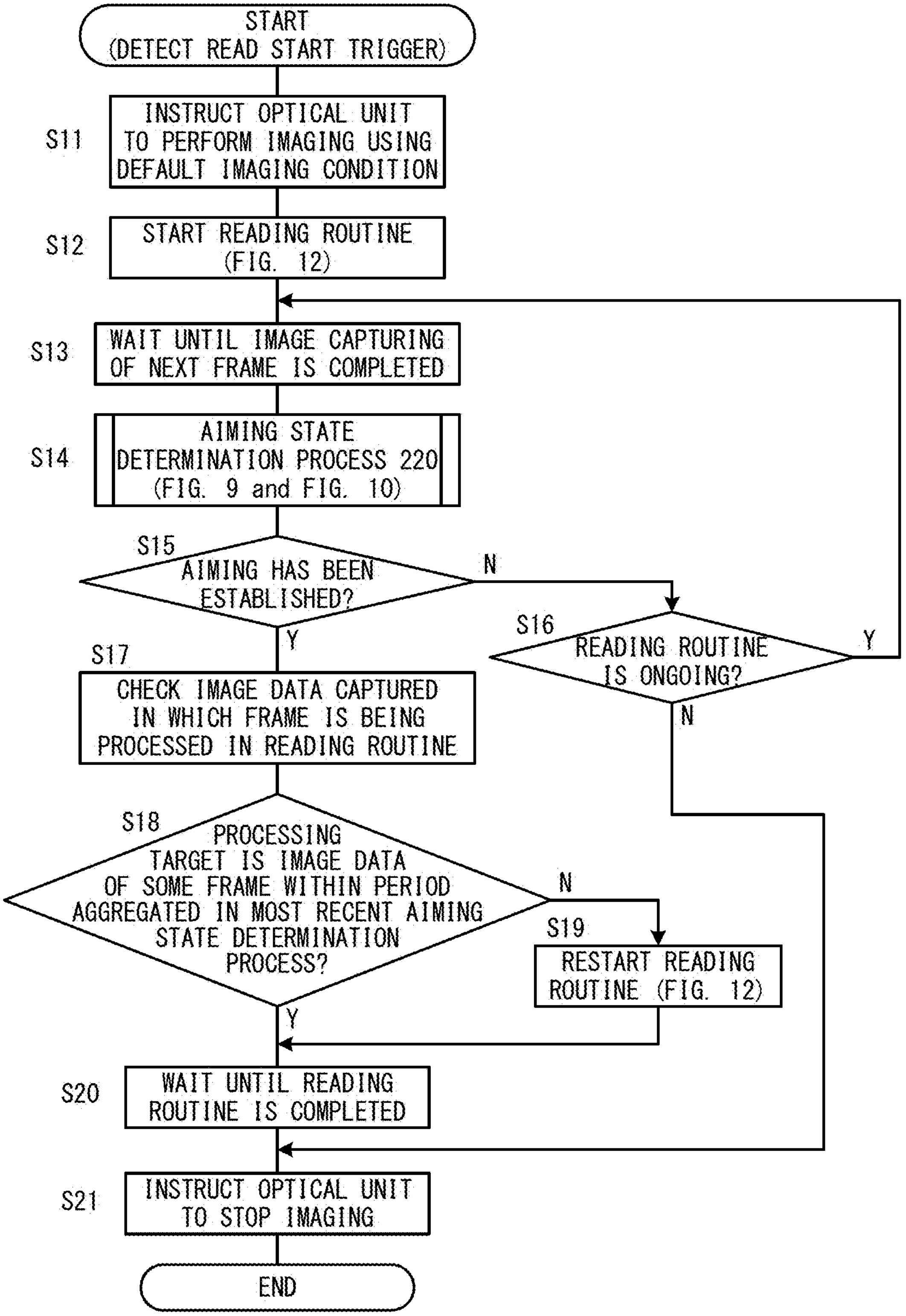
FIG. 5 is a flowchart of a process executed by a CPU 121 of the reading device 100 when a read start trigger is detected.

Firstly, FIG. 5 shows a flowchart of a process executed by the CPU 121 when a read start trigger is detected.

In this process, the CPU 121 first instructs the optical unit 110 to perform imaging using a default imaging condition registered in advance (S11). Thereafter, the optical unit 110 continues capturing images for each frame period in accordance with the imaging condition set at that time, until an instruction to stop imaging is given. The imaging condition may be changed in the course of operation. The default imaging condition may always be the same, or may be automatically changed according to settings made by the user or the surrounding conditions detected by some sensor.

Figure 12:
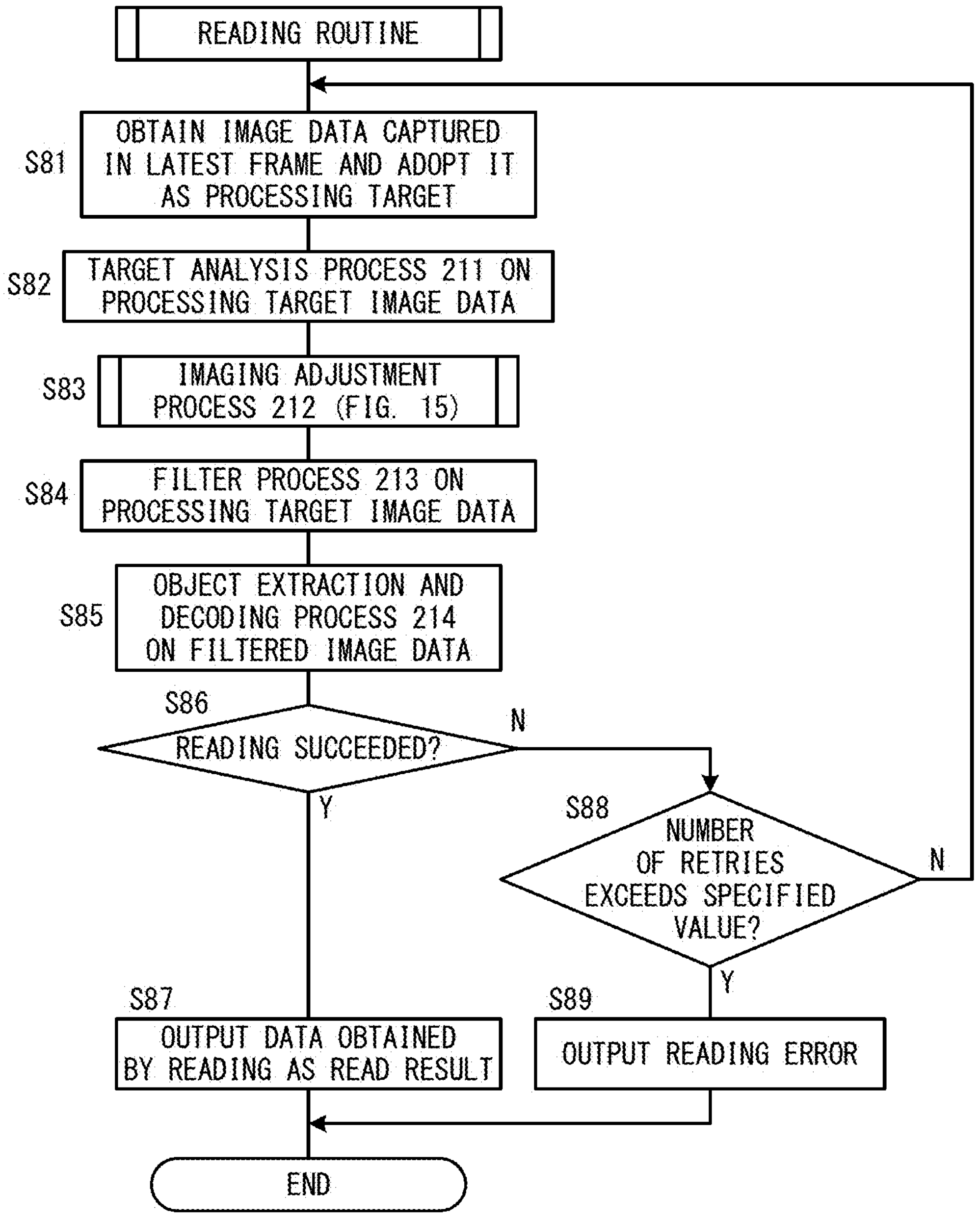
FIG. 12 is a flowchart of a reading routine started by the process shown in FIG. 5.

Next, the CPU 121 starts a reading routine shown in FIG. 12 (S12). The reading routine of FIG. 12 corresponds to the reading process 210 shown in FIG. 3 to FIG. 4B and a process related to retries thereof. Details of the reading routine will be described later.

Figure 9:
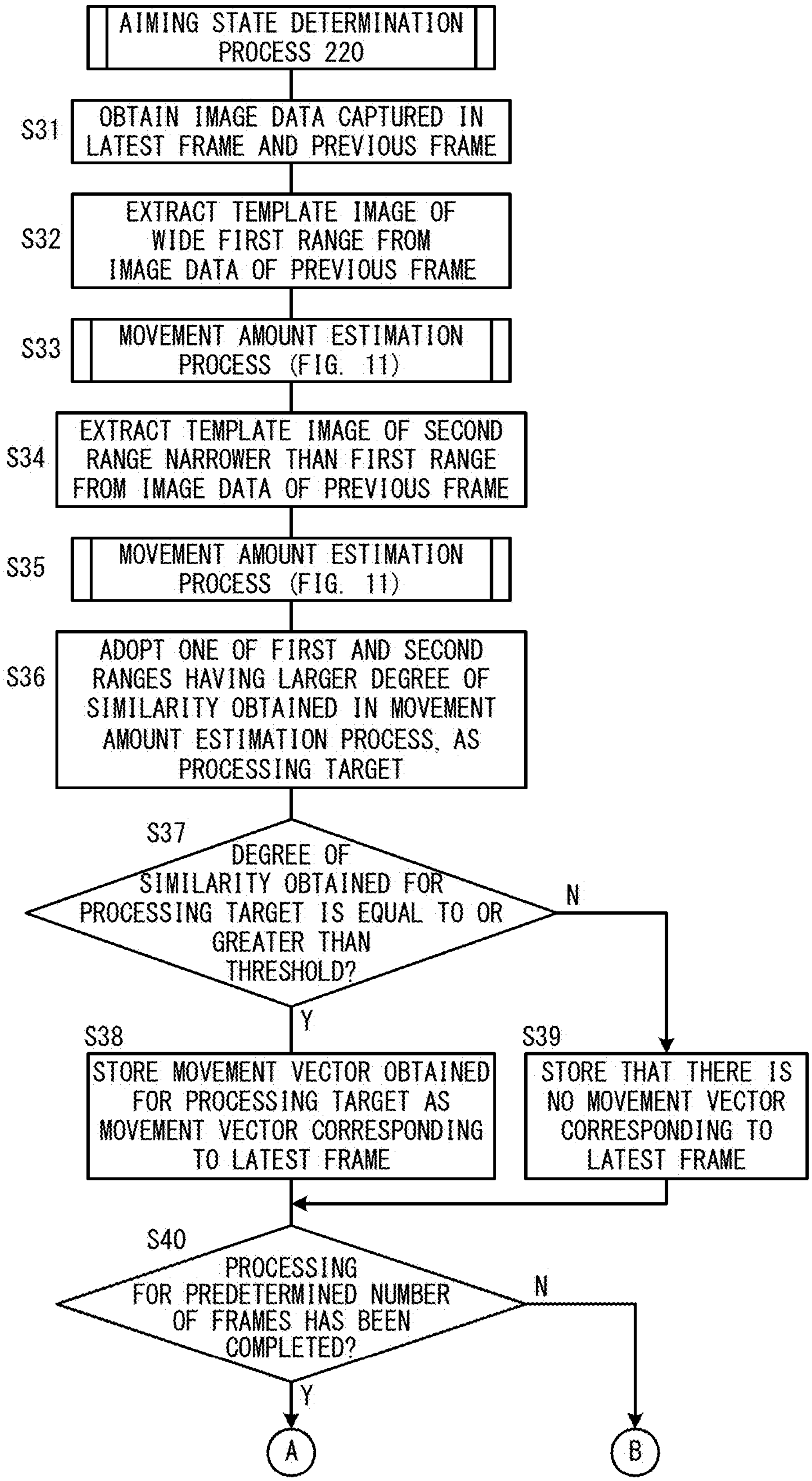
FIG. 9 is a flowchart of an aiming state determination process 220 executed by the CPU 121 of the reading device 100.
Figure 10:
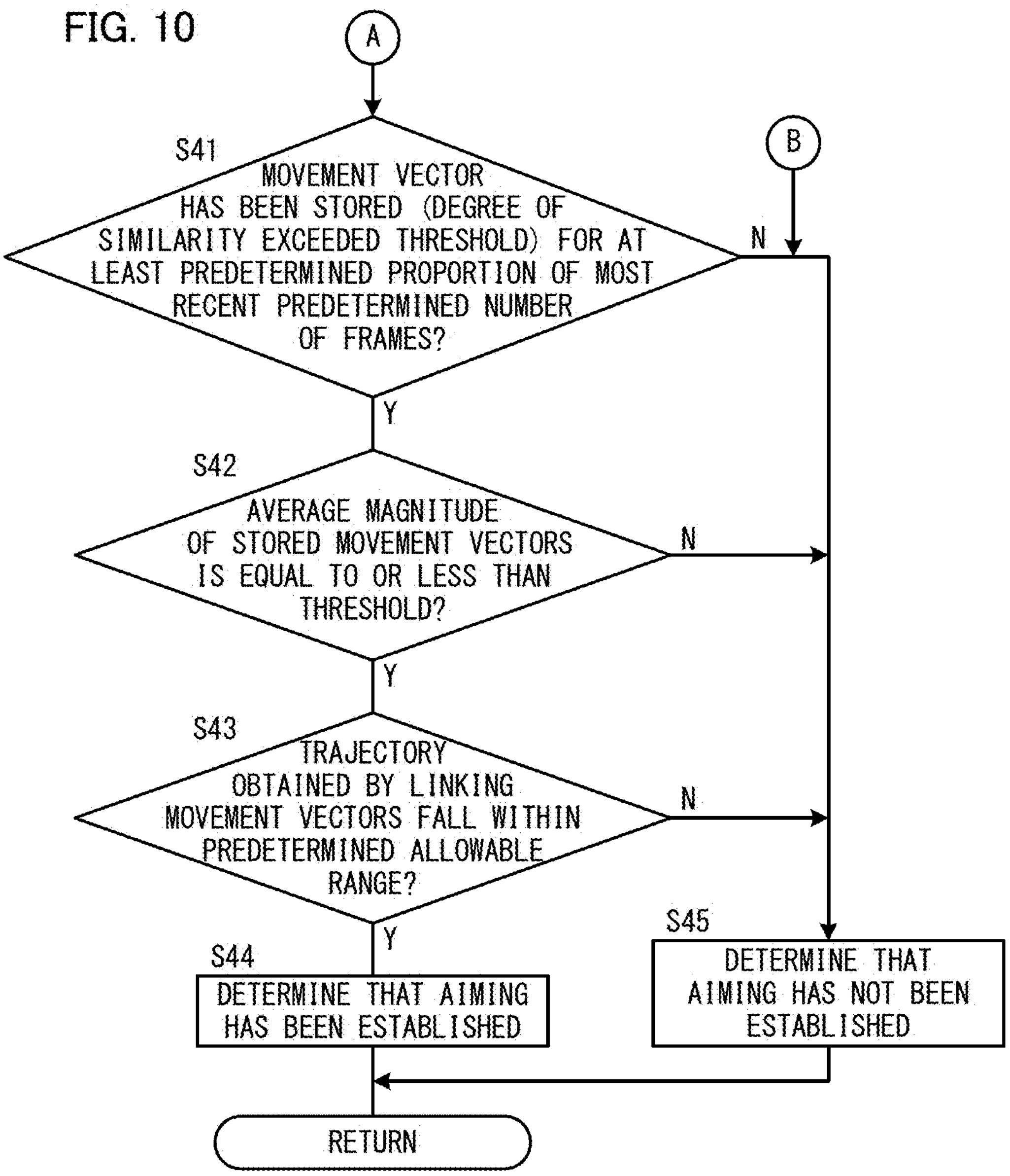
FIG. 10 is a flowchart showing a continuation of the process shown in FIG. 9.

Thereafter, the CPU 121 waits until the imaging sensor 111 completes capturing of an image in the next frame (S13), and upon completion, executes the aiming state determination process 220 shown in FIG. 9 and FIG. 10 (S14). Details of the aiming state determination process 220 will also be described later.

If the CPU 121 determines in the aiming state determination process 220 that aiming has not been established (No in S15), and the execution of the reading routine is ongoing (Yes in S16), the CPU 121 returns to step S13 and repeats the process. That is, the aiming state determination process 220 is executed each time capturing of one frame is completed.

If the process of the reading routine has completed in step S16, the CPU 121 instructs the optical unit 110 to stop imaging (S21) and ends the processing. This route is followed when aiming has not been established until reading succeeds, or until failure is confirmed after the specified number of retries, and a reading process 210*b* is not newly started in the manner described with reference to FIG. 4B until the end.

On the other hand, when the aiming has been established in step S15, the CPU 121 checks image data captured in which frame is the processing target in the reading routine (S17). If the processing target is not the image data captured in some frame within the period (the predetermined time range T) aggregated in the most recent aiming state determination process 220 (No in S18), the CPU 121 restarts the reading routine shown in FIG. 12 (S19). This process newly initiates the reading process 210. The reading routine being executed may be aborted. The count of the number of retries referenced in step S88 of FIG. 12 may be inherited from the reading routine being executed to the restarted reading routine. This route corresponds to the case shown in FIG. 4B.

If the determination in step S18 is affirmative, step S19 is skipped, and the reading routine being executed is continued as is. This route corresponds to the case shown in FIG. 4A.

In either case, the CPU 121 then waits until the reading routine is completed while monitoring the execution status of the reading routine (S20). When the reading routine is completed, the CPU 121 instructs the optical unit 110 to stop imaging (S21) and ends the processing.

Through the above process, the time until a read result can be output can be shortened, as described with reference to FIG. 4A and FIG. 4B. Steps S15 to S19 correspond to a read control step, which corresponds to the function of the reading control part 146.

Next, with reference to FIG. 6A to FIG. 8B, an outline of estimation of the amount of movement of the imaging sensor 111 and determination of whether aiming has been established, which are performed in the aiming state determination process 220, will be described.

Figure 6A:
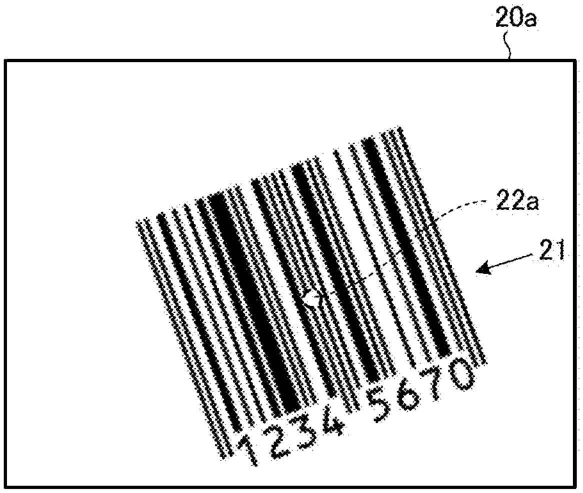
FIG. 6A and FIG. 6B are diagrams illustrating examples of images captured in two consecutive frames.
Figure 6B:
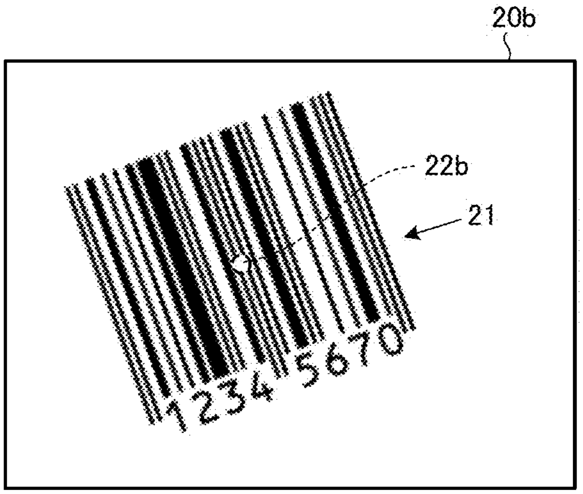

First, FIG. 6A and FIG. 6B respectively show examples of images 20*a* and 20*b* captured in two consecutive frames. Image 20*a* is the image of the preceding frame, and image 20*b* is the image of the subsequent frame. Both images include a code symbol 21, which is optical information of the read object. Reference signs 22*a* and 22*b* indicate positions, in the respective images 20*a* and 20*b*, of virtual reference points used for estimating the movement distance.

When the imaging sensor 111 is moved (relative to the code symbol 21) between the imaging timing of one frame and the imaging timing of the next frame, the position of the code symbol 21 in the image differs between the images 20*a* and 20*b* captured in these two frames. Here, assuming that rotation of the imaging sensor 111 (or the optical unit 110 including the sensor) or the code symbol 21 (or the read object carrying it) is unlikely around the time aiming is established, and thus by considering only translational movement, the amount of movement of the code symbol 21 in the image can be regarded as corresponding to the amount of movement of the imaging sensor 111.

Figure 6C:
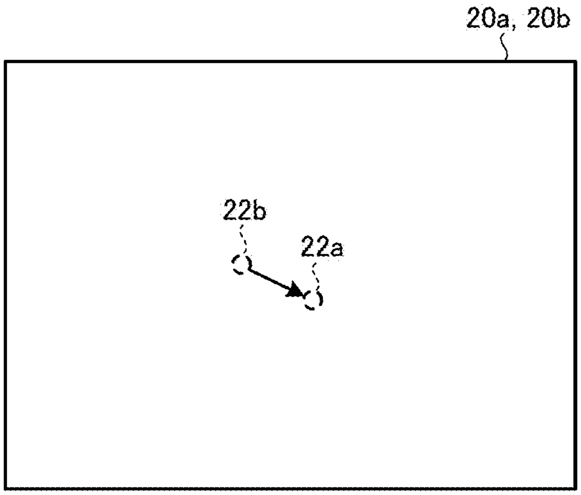
FIG. 6C is a diagram for explaining estimation of the amount of movement of an imaging sensor 111 based on positions of feature points in those images.

Accordingly, by detecting where a reference point in the image 20*a* has moved in the image 20*b* and plotting their positions as shown in FIG. 6C, it is possible to estimate the amount of movement of the imaging sensor 111 during one frame period between the two frames.

A vector (referred to as a "movement vector") from the position 22*b* of the reference point in the later frame image 20*b* toward the position 22*a* of the reference point in the earlier frame image 20*a* represents an estimated direction and magnitude of the movement of the imaging sensor 111 between the two frames. However, if the image scale (distance in real space per pixel) is unknown, the actual movement distance in real space cannot be determined. Although the magnitude of the movement vector can be obtained in pixel units, only the relative size of the movement distance can be estimated from this. If the image scale can be estimated separately, the actual movement distance can also be estimated.

It is considered that around the time aiming is established, the operator rarely moves the imaging sensor 111 or the code symbol 21 in a direction perpendicular to the plane appearing in the image, and therefore, in determining whether aiming is established, the relative movement direction between the imaging sensor 111 and the code symbol 21 may substantially be regarded as only the direction parallel to the plane appearing in the captured image.

In this case, all points on the image 20*a* are considered to shift in the same direction and by the same magnitude in the image 20*b*. Accordingly, regardless of which point on the image 20*a* is selected as the reference point, the movement vector obtained will be the same. However, because the reference point must remain within the frame of the image 20*b* even after the shift, it is preferable to select the reference point near the center of the image.

In actual processing, it is difficult to precisely estimate where a specific point on the image 20*a* is located on the image 20*b*. Therefore, a predetermined region near the center of the image 20*a* is used as a template image, and this template image is sequentially compared with images of the same size at various positions in the image 20*b* to search for the position most similar to the template image (i.e., with the smallest degree of dissimilarity). The movement vector is then determined on the assumption that the template image has moved to the position determined to be the most similar.

Figure 7A:
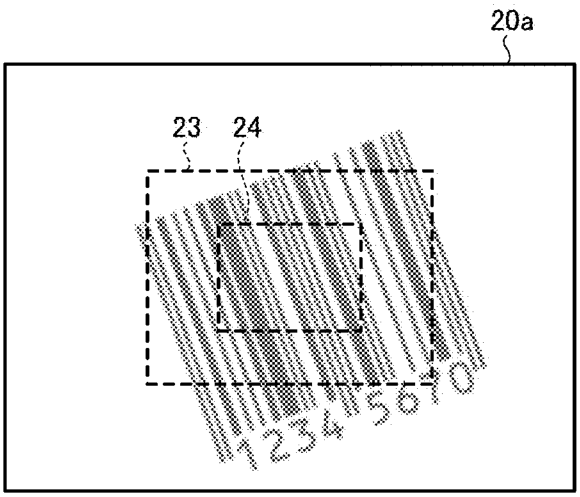
FIG. 7A is a diagram illustrating an example of a region used as a template image in an image captured in one frame.

FIG. 7A shows an example of the region used as the template image in the image 20*a*.

Here, when determining the destination position, it is preferable that the region allows sampling of many pixels of the optical information portion to be read, because a greater variety of changes in black-and-white patterns of the image enables more accurate determination. However, if a wide region of the image is used as the template image, the points within the region must be sampled sparsely to achieve faster processing speed, resulting in reduced determination accuracy. In addition, in a case where the optical information to be read is small and a uniform background extends around it, using a wide region as the template image reduces the contribution of the optical information portion, also lowering the determination accuracy.

On the other hand, if a narrow region of the image is used as the template image, sampling can be performed densely, but a problem arises in that high similarity may occur even at positions different from the actual movement when locally bright or dark areas produce white-filled or black-filled regions. In addition, in the case of an image containing an object with parallel linear outlines, such as a barcode, there is a problem that high similarity may occur at a position shifted in parallel with the outlines, regardless of the actual movement.

Therefore, in this embodiment, as shown in FIG. 7A, a relatively wide template image 23 and a narrower template image 24 are used, and each is compared with the image 20*b*. For example, the template image 23 may be defined as a region whose center coincides with the center of image 20*a* and that covers one-half of the total number of pixels vertically and horizontally, whereas the template image 24 may cover one-quarter of the total number of pixels in the same manner.

Figure 7B:
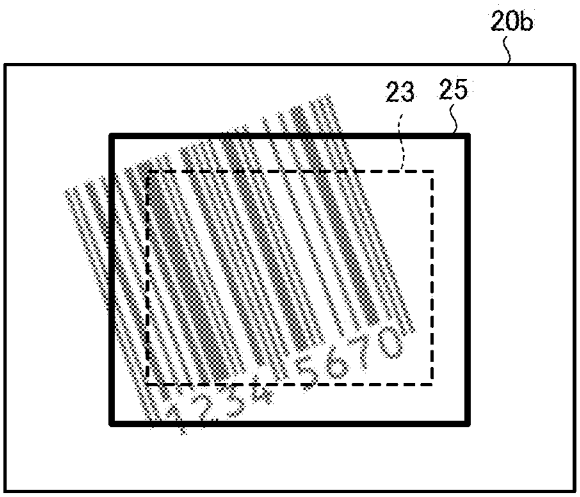
FIG. 7B is a diagram illustrating an example of a search range in an image of a subsequent frame for comparison with the template image.

FIG. 7B shows, taking the wide template image 23 as an example, an example of a search range 25 in the image 20*b* for comparison with the template image 23. The search range 25 may be defined as a region obtained by expanding the region around the position of the template image 23 in the image 20*a* by approximately the maximum amount of movement expected as an estimation result. If the search range 25 is set too wide, the computational load increases and the time required for the aiming state determination process 220 becomes longer. It is therefore preferable to determine the size of the search range 25 in view of this point.

By extracting image portions of the same size as the template image 23 from various positions within the search range 25 and calculating the degree of the dissimilarity to the template image for each image portion, the position with the smallest degree of dissimilarity can be identified.

For each frame within the predetermined time range T, a movement vector can be obtained as described above, and by connecting the obtained movement vectors, the movement path and movement range of the imaging sensor 111 within the predetermined time range T can be estimated. Strictly speaking, the image scale may vary for each frame; however, even if differences in scale are ignored, sufficient estimation accuracy for determining whether aiming has been established can still be achieved, considering the direction of movement expected to occur around the time aiming is established. This point has been confirmed by experiments by the inventor.

Figure 8A:
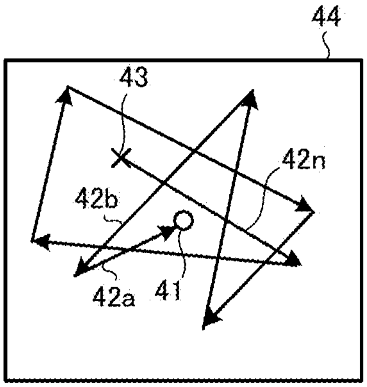
FIG. 8A and FIG. 8B are diagrams respectively illustrating examples of movement paths obtained by connecting movement vectors of each frame within a predetermined time range T.
Figure 8B:
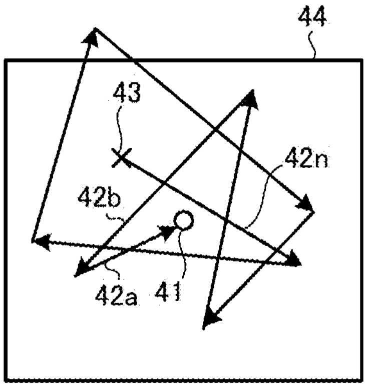

FIGS. 8A and 8B illustrate examples of movement paths obtained by connecting movement vectors of respective frames within the predetermined time range T determined in this manner.

Each arrow in the figures represents one movement vector, and reference sign 41 denotes a virtual movement end position within the predetermined time range T. The movement vector 42*a* of the last frame is arranged such that its tip is at the movement end position 41, the movement vector 42*b* of the immediately preceding frame is arranged such that its tip is at the base of the movement vector 42*a*, and so on, the movement vectors of the respective frames are arranged one by one. Then, the base position of the movement vector 42*n* of the first frame becomes a virtual movement start position 43 within the predetermined time range T.

For example, when all of the movement vectors 42*a* to 42*n* arranged in this manner fall within a predetermined allowable range 44 centered on the movement end position 41, as illustrated in FIG. 8A, it can be determined that the movement amount of the imaging sensor 111 satisfies the first upper limit and that aiming has been established.

On the other hand, even if the movement end position 41 and the movement start position 43 are the same as in FIG. 8A, if at least part of the movement vectors 42*a* to 42*n* protrude beyond the allowable range 44 as shown in FIG. 8B, it can be determined that aiming has not been established.

When aiming has been established, even if the imaging sensor 111 exhibits slight movement due to the operator's hand motion, the movement is considered to occur only in the vicinity of a specific point, and therefore whether the movement vectors fall within the allowable range 44 is used as a criterion. Even if the movement amount per frame is relatively large, aiming can still be regarded as established as long as the movement occurs only around a specific point. Thus, using the allowable range 44 as a criterion allows aiming establishment to be detected more accurately than using only the amount of movement as the criterion.

Even when aiming has been established, if the movement amount per frame is relatively large, image blur may become significant, which may cause the reading process 210 to fail. Therefore, in this embodiment, it is determined that aiming has not been established also when the movement amount per frame (i.e., the average magnitude of the movement vectors) exceeds a predetermined threshold. However, it is not essential to adopt this criterion.

Figure 11:
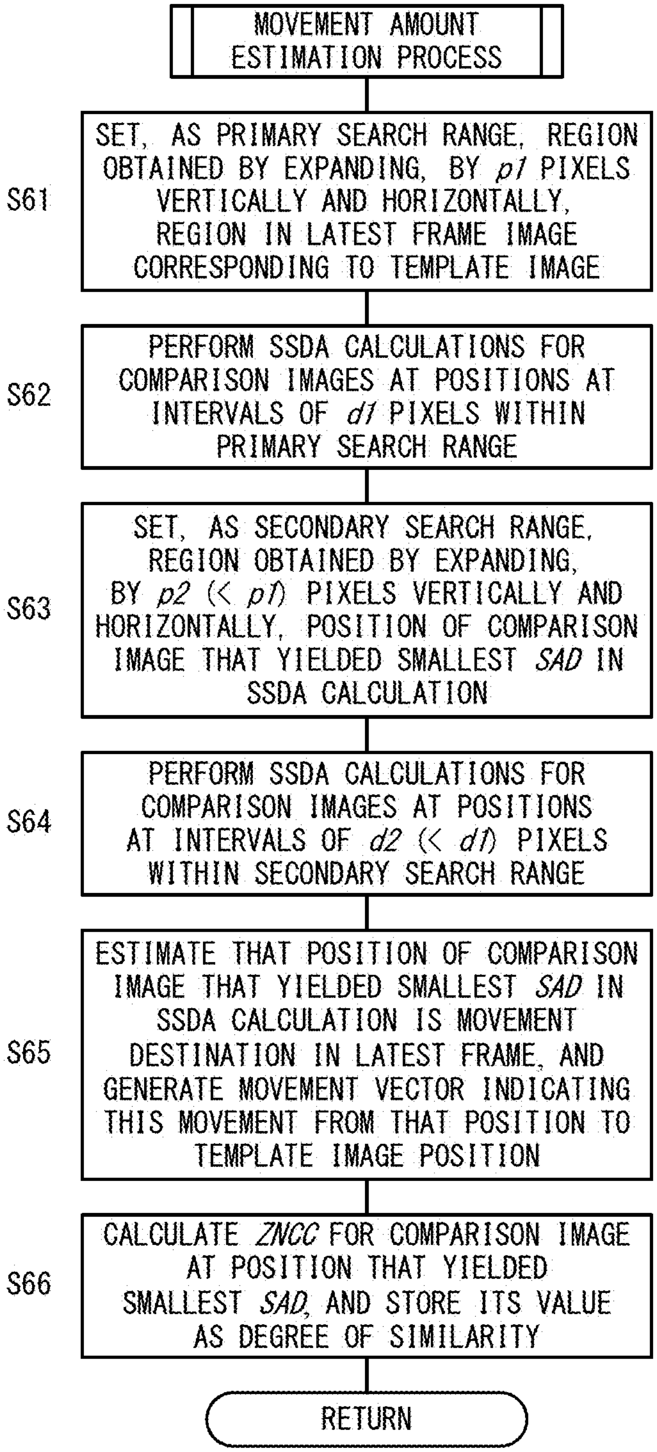
FIG. 11 is a flowchart of a movement amount estimation process executed during the process shown in FIG. 9.

Next, FIG. 9 and FIG. 10 show a flowchart of an aiming state determination process 220 for performing the aiming state determination as described above. FIG. 11 shows a flowchart of a movement amount estimation process executed during the process of FIG. 9.

Steps of the aiming state determination process 220 correspond to an estimation step, which corresponds to the function of the aiming state determination part 145.

In the aiming state determination process 220 of FIG. 9, the CPU 121 first obtains image data captured in the latest frame and in the previous frame (S31). Then, the CPU 121 extracts a template image of a wide first range from the image data of the previous frame (S32), and executes the movement amount estimation process of FIG. 11 using the template image (S33). The template image is as described with reference to FIG. 7A.

In the movement amount estimation process of FIG. 11, the CPU 121 first sets, as a primary search range, a region obtained by expanding, by p1 pixels vertically and horizontally, the region in the latest frame image that corresponds to the template image (S61). Then, for each position in the primary search range at intervals of d1 pixels in both vertical and horizontal directions, the CPU 121 uses an image of the same size as the template image at the position as a comparison image and executes an SSDA (Sequential Similarity Detection Algorithm) calculation for each comparison image (S62).

SSDA is such that an SAD (Sum of Absolute Difference) represented as RSAD in Math. 1 is calculated according to Math. 1, in which the summation of 2 is performed over each pixel in the image, and the calculation is terminated midway through the summation of E if the SAD exceeds a threshold.

[Math. 1]

$$R_{SAD} = \sum_{x=0}^{W-1} \sum_{y=0}^{H-1} |I(x, y) - T(x, y)|$$

$W$: number of horizontal pixels of the template image $H$: number of vertical pixels of the template image $T(x, y)$: pixel value at coordinate $(x, y)$ in the template image $I(x, y)$: pixel value at coordinate $(x, y)$ in the comparison image For the first comparison image, the SAD is calculated without the threshold, and the obtained SAD is used as the threshold for calculating the SAD for the next comparison image. If the SAD exceeds the threshold midway through the summation of 2, the calculation is terminated and the process proceeds to the calculation for the next comparison image. If the SAD can be calculated without exceeding the threshold until the end of the summation of 2, the obtained SAD value is used as the next threshold. The position of the comparison image at this time is stored. The above process is performed for comparison images at all positions, and the final threshold value and the position of the comparison image when the threshold is obtained are acquired as the result of the SSDA calculation.

In cases where the computational load of the SSDA is high and the calculation takes too much time, the calculation may be performed only for pixels sampled at appropriate intervals, such as two pixels or three pixels, within the template image and the comparison image.

In the SSDA of step S62, it is possible to determine the position of the comparison image within the primary search range where the smallest SAD is obtained, that is, the position of the comparison image having the smallest degree of dissimilarity to the template image. This position can be regarded as a candidate for the movement destination of the template image. In addition, since the calculation can be terminated midway through the summation of 2 once it is determined that the SAD will not become the smallest, the total amount of calculation can be reduced. The SAD can be used as an index indicating the degree of dissimilarity between the two images, but other indices may also be used.

Next, the CPU 121 sets, as a secondary search range, a region obtained by expanding, by p2 pixels vertically and horizontally, the position of the comparison image at which the smallest SAD was obtained in the SSDA (S63), provided that p2<p1. Then, for each position in the secondary search range at intervals of d2 pixels in both vertical and horizontal directions, the CPU 121 uses an image of the same size as the template image at the position as a comparison image and executes the SSDA calculation for each comparison image (S64), provided that d2<d1.

The process of steps S63 and S64 is to perform a more precise search around the candidate of the movement destination obtained in steps S61 and S62.

The CPU 121 estimates that the position at which the smallest SAD was obtained in the SSDA in step S64 is the movement destination of the template image in the latest frame image, and generates, as a movement vector, a vector indicating movement from that position to the position of the template image (S65). In addition, the CPU 121 calculates a ZNCC (Zero-mean Normalized Cross-Correlation) for the comparison image at the position where the smallest SAD was obtained, stores the obtained value as a degree of similarity (S66), and returns to the original flow.

The ZNCC, represented as $R_{ZNCC}$, can be calculated according to Math. 2 and can be used as an index of the degree of similarity indicating how similar the two images are. However, other indices may also be used instead. When the similarity is low, the movement destination obtained by the SSDA may be considered unreliable.

[Math. 2]

$$R_{ZNCC} = \frac{\sum_{x=0}^{W-1}\sum_{y=0}^{H-1}\left[\{I(x,y)-\overline{I}\}\{T(x,y)-\overline{T}\}\right]}{\sqrt{\sum_{x=0}^{W-1}\sum_{y=0}^{H-1}\left[\{I(x,y)-\overline{I}\}^2\right]\sum_{x=0}^{W-1}\sum_{y=0}^{H-1}\left[\{T(x,y)-\overline{T}\}^2\right]}}$$

$\overline{T}$: average of pixel values of pixels in the template image $\overline{I}$: average of pixel values of pixels in the comparison image Returning to FIG. 9, after step S33, the CPU 121 extracts a template image of a second range narrower than the first range from the image data of the previous frame (S34), and executes again the movement amount estimation process of FIG. 11 using the template image (S35).

Thereafter, the CPU 121 adopts, as a processing target, one of the first range and the second range having a larger degree of similarity obtained in the movement amount estimation process (S36), and determines whether the degree of similarity obtained for the processing target is equal to or greater than a predetermined threshold (S37). The threshold may be determined based on a required similarity level at which the result of the SSDA can be considered reliable.

If the determination in step S37 is affirmative, the CPU 121 stores the movement vector obtained for the processing target as a movement vector corresponding to the latest frame (S38). If the determination is negative, the CPU 121 does not adopt the movement vector obtained in this instance and stores that there is no movement vector corresponding to the latest frame (S39).

In either case, the CPU 121 next determines whether processing for a predetermined number of frames has been completed (S40), that is, whether the aiming state determination process 220 has been performed for a sufficient number of frames to determine whether the aiming is established. The predetermined number of frames corresponds to the predetermined time range T shown in FIG. 4A and FIG. 4B. Although six frames are shown in FIG. 4A and FIG. 4B, the number is not limited thereto.

If the determination in step S40 is affirmative, the process proceeds to step S41 of FIG. 10.

Then, the CPU 121 determines, for each of the following conditions, whether it is satisfied: (S41) whether a movement vector has been stored, namely, whether it has been determined in step S37 that the degree of similarity exceeds the threshold, for at least a predetermined proportion of the most recent predetermined number of frames; (S42) whether the average magnitude of the movement vectors stored for the most recent predetermined number of frames is equal to or less than a threshold; and (S43) whether a trajectory (movement range; see FIG. 8A and FIG. 8B) obtained by linking the movement vectors stored for the most recent predetermined number of frames falls within a predetermined allowable range 44.

If all of these determinations are affirmative, the CPU 121 determines that the aiming at the optical information of the read object has been established (S44). If any one of the determinations is negative, the CPU 121 determines that the aiming has not been established (S45). If the determination in step S40 is negative, the CPU 121 also determines that the aiming has not been established (S45), because sufficient information has not been obtained to determine that the aiming has been established. After step S44 or S45, the process returns to the original flow.

The determination in step S41 is provided because, if the number of reliable movement vectors is too small, the determination of the movement range in step S43 cannot be performed appropriately. The predetermined proportion may be, for example, 25%.

The determination in step S42 is provided because, even if the overall movement range falls within the predetermined allowable range 44, it is difficult to consider that the aiming has been established if the movement per frame is excessively large, and such state is considered unsuitable for reading.

The determination in step S43 is as described with reference to FIG. 8A and FIG. 8B. However, when obtaining an estimation result of the movement range by linking movement vectors, the movement vectors that were not adopted in step S39 may be ignored and skipped in the linking. For example, if the movement vector of the N-th frame was not adopted, the tip of the movement vector of the (N−1)-th frame may be connected to the root of the movement vector of the (N+1)-th frame.

Through the above processing, the reading device 100 can estimate the movement amount of the imaging sensor 111 and, based on the result, determine whether the aiming at the optical information of the read object has been established. In the case where the determination considers a movement path as in step S43, at least two movement vectors are required. If there is only one movement vector, the determination is equivalent to merely considering the movement distance or magnitude. Therefore, at least two instances of the aiming state determination process 220 need to be performed in order to determine that aiming has been established, and image data of at least three frames are used for this purpose.

Next, FIG. 12 shows a flowchart of the reading routine that is activated in the process of FIG. 5.

The reading routine is executed in parallel with the process of FIG. 5. Steps S81 to S85 correspond to the reading process 210 described with reference to FIG. 3, and the process from step S86 onward relates to retries thereof. Steps of the reading routine correspond to a reading step, and in these steps, the CPU 121 functions as a reading part.

In the process of the reading routine, the CPU 121 first obtains image data of an image captured in the latest frame at that time and adopts it as a processing target (S81). Thereafter, the CPU 121 sequentially executes the target analysis process 211, the imaging adjustment process 212, the filter process 213, and the object extraction and decoding process 214 on the image data serving as the processing target (S82 to S85). Each of these processes has been described with reference to FIG. 3, and details of the imaging adjustment process 212 will be described later.

Thereafter, the CPU 121 determines whether the reading of the optical information succeeded in the object extraction and decoding process 214 (S86). If the determination is affirmative, the CPU 121 outputs the data obtained by the reading as a read result (S87) and terminates the processing. If the determination is negative in step S86, the CPU 121 repeats the processing by returning to step S81 until the number of retries exceeds a specified value (No in S88). When the specified value is exceeded (Yes in S88), the CPU 121 outputs a reading error (S89) and terminates the processing.

Through the above, the reading device 100 executes the operation described with reference to FIG. 3.

Next, with reference to FIG. 13A to FIG. 14, a basic concept of the imaging adjustment process 212 will be described.

The imaging adjustment process 212 is, as described above, a process of adjusting imaging condition of the optical unit 110 based on the content of the image data and the imaging condition used for the imaging thereof. More specifically, it adjusts an integrated light amount to be given to the imaging sensor 111 during imaging and an amplification factor (gain) of the imaging sensor 111.

In more detail, a frequency distribution of pixel values in a specific region (referred to as "brightness reference region") in an image obtained by imaging under a certain imaging condition is obtained, and from this frequency distribution, a brightness index value, which serves as a reference for adjustment, is determined. Then, the integrated light amount and the amplification factor are adjusted such that a brightness index value similarly obtained for an image to be captured in the next imaging is expected to become a predetermined target brightness index value, that is, such that the brightness of the image to be captured in the next imaging is expected be a predetermined target level defined by the target brightness index value. It should be noted that the brightness index value and the target brightness index value described below are not numerical values directly indicating the brightness of an image but can indicate the level of brightness of the image.

Figure 13A:
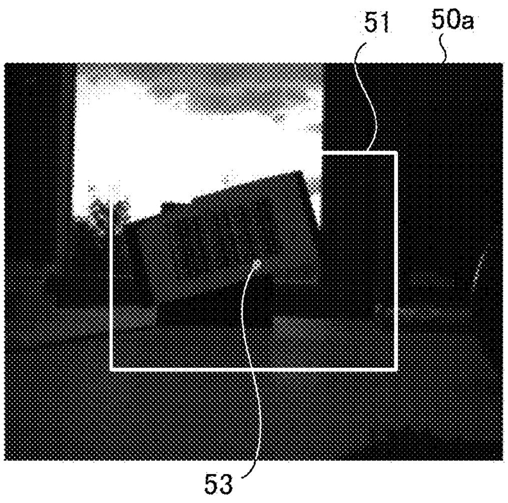
FIG. 13A and FIG. 13B are diagrams illustrating respective examples of brightness reference regions defined in an imaging adjustment process 212.
Figure 13B:
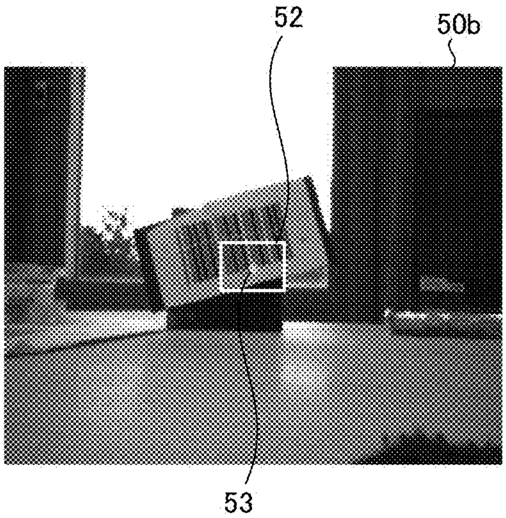

FIG. 13A and FIG. 13B show examples of brightness reference regions defined in the imaging adjustment process 212.

FIG. 13A shows an example of a relatively wide brightness reference region 51 defined when aiming has not been established (that is, when the aiming state determination process 220 has determined that the aiming has not been established). FIG. 13B shows an example of a relatively narrow brightness reference region 52 defined when the aiming has been established. These brightness reference regions 51 and 52 define reference regions from which pixel values used as a basis for adjusting the imaging condition are obtained.

Here, the reason why the imaging adjustment process 212 performs adjustment based not on the entire image but on the image within the brightness reference regions is to adjust the imaging condition, based on the state of the image in the vicinity of the optical information of the read object, so that the optical information appears in the image in a manner that facilitates reading. Therefore, ideally, the brightness reference region should be exactly the same as the region in which the optical information is present.

However, the more necessary the adjustment of the imaging condition is, the more difficult it is to specify the position of the optical information in the image. Therefore, when the aiming at the optical information has not been established, a relatively wide region in the image 50*a* is defined as the brightness reference region 51, as shown in FIG. 13A, in the expectation that the optical information is present somewhere within the defined region. If the aiming light 53 can be detected, the brightness reference region 51 may be defined around the aiming light 53 with the aiming light 53 as the center, or the region may be defined around the center position of the image 50*a*. The region may also be defined based on any other appropriate position.

On the other hand, as shown in the image 50*a* in FIG. 13A, in a case where, for example, optical information such as a barcode is carried on a non-light-emitting body and there is a strong light source such as a window through which light enters in the vicinity thereof, the characteristics of the image, such as brightness, may differ greatly between the optical information and its surroundings. In such a case, if a wide region is defined as the brightness reference region, there is a possibility that the imaging condition will be adjusted based on a portion having characteristics that differ significantly from those of the area of the optical information. In the example of FIG. 13A, for instance, even though the area of the optical information is dark, the imaging condition may be adjusted to make the entire image darker because the surrounding area is bright.

The reason why the imaging condition is not adjusted based on the entire image but the brightness reference region 51 is defined in a part of the image 50*a*, even when the aiming at the optical information has not been established, is to alleviate this negative effect, at least to some extent.

On the other hand, when the aiming at the optical information has been established, it is assumed that the operator has aligned the aiming light emitted from the LD 113 with the position of the optical information to be read, and therefore the optical information is expected to be present in the vicinity of the aiming light. Accordingly, as shown in FIG. 13B, by defining the brightness reference region 52 in a relatively narrow region (at least narrower than the brightness reference region 51) around and near the position of the aiming light 53 in the image 50*b*, the imaging condition can be adjusted in a manner that contributes to the successful reading of the optical information.

The size of the brightness reference region 52 may be preferably determined, taking into account standard usage conditions of the reading device 100 and typical modes of carrying the optical information, so that, when the aiming at the optical information has been established, it can be expected not to capture the background image other than the carrier around the optical information in a proportion that cannot be ignored. A plurality of candidates of the size may be prepared, and switching among them may be enabled according to a setting of a reading mode.

When the aiming light 53 is not used or cannot be detected, it may be assumed that the operator aligns the position of the optical information with the vicinity of the center of the imaging area. Therefore, by defining the brightness reference region 52 in a relatively narrow region near the center of the image 50*b*, a similar effect can be expected. However, the brightness reference region 52 may alternatively be defined based on any other appropriate position in the image that is assumed to be aligned by the operator with the optical information.

By defining such a narrow brightness reference region 52 as described above, even when the characteristics of the image, such as brightness, differ greatly between the optical information and its surroundings, the imaging condition can be adjusted, based on the state of the image in the vicinity of the optical information, so that the optical information appears in the image in a manner that facilitates reading.

The adjustment of the integrated light amount and the amplification factor based on the image of the brightness reference region can be performed as follows, as an example.

First, a certain number of pixels are sampled evenly from within the brightness reference region, the pixel values are collected, and a frequency distribution thereof is obtained. The sampling may be performed, for example, at 400 points arranged as 20 points in the vertical direction and 20 points in the horizontal direction.

Figure 14:
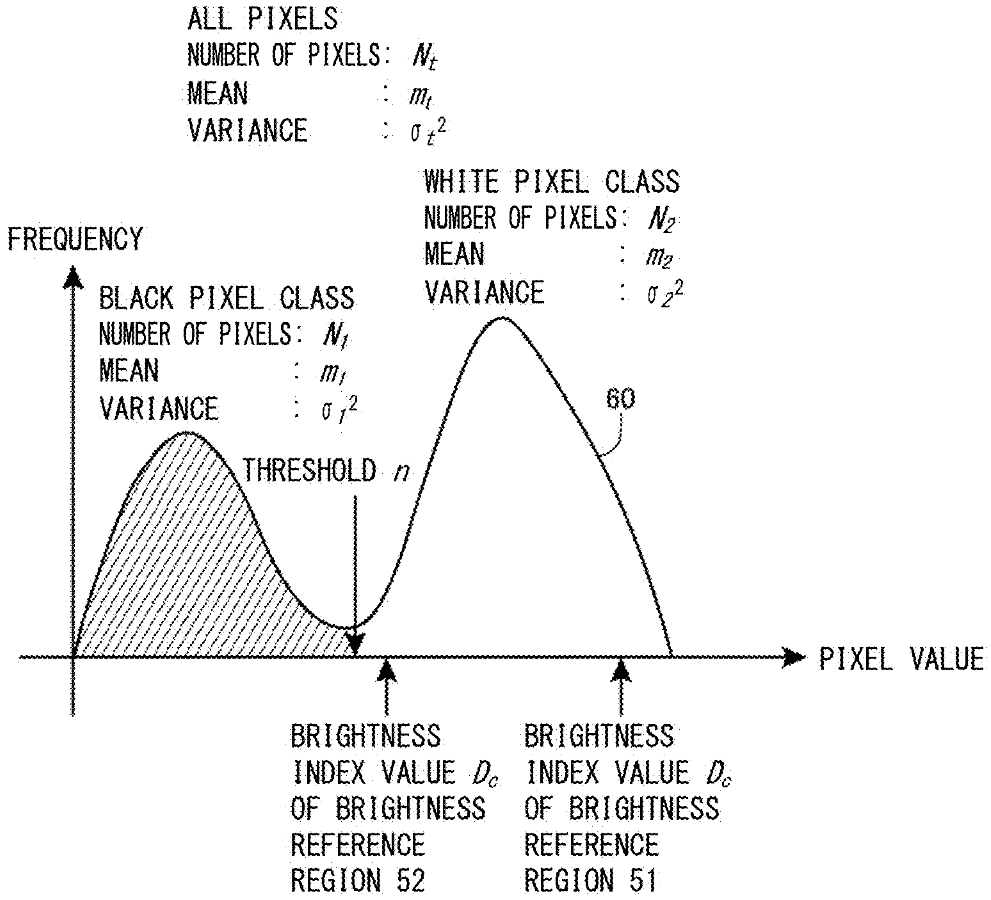
FIG. 14 is a diagram illustrating an example of a frequency distribution of pixels within a brightness reference region and also for explaining classification of the pixels into a black pixel class and a white pixel class by a discriminant analysis method.

FIG. 14 shows an example of this frequency distribution. A graph of the relative frequency distribution is indicated by reference sign 60. From this frequency distribution, the above-described brightness index value can be obtained.

For example, when a relatively wide brightness reference region 51 is used, in a case where brighter pixels have larger pixel values, a pixel value at an appropriate quantile near the upper end of the cumulative relative frequency may be used as a brightness index value $D_c$, and by setting the target brightness index value to a value of about 600 in a 1024-gradation system, relatively good adjustment can be achieved, as confirmed by the experiments by the inventor. The reason of selecting a quantile near the upper end rather than the upper end itself as the brightness index value $D_c$ is to exclude portions of overexposure caused by specular reflection.

Then, assuming that a black level of the imaging sensor 111 is $D_b$, an integrated light amount at the imaging in which the brightness index value De is obtained is $I_c$, an amplification factor of the imaging sensor 111 is $g_c$, and a proportional constant determined by the surrounding environment at the time of imaging is k, the following relationship is considered to hold:

$$D_c - D_b = k \times I_c \times g_c \tag{1}$$

Further, assuming that an integrated light amount and an amplification factor to be set to realize a target brightness index value $D_T$ are $I_n$ and $g_n$, respectively, the following relationship is also considered to hold:

$$D_T - D_b = k \times I_n \times g_n \tag{2}$$

From Equations (1) and (2), the following relationship can be derived:

$$I_n \times g_n = (D_T - D_b)/(D_c - D_b) \times I_c \times g_c \tag{3}$$

Therefore, in the adjustment of the imaging condition, appropriate values of $I_n$ and $g_n$ may be obtained based on the values of $D_c$, $D_T$, $D_b$, $I_c$, and $g_c$ in accordance with Equation (3), and set in the optical unit 110.

Note that the integrated light amounts $I_c$ and $I_n$ can be defined by an exposure time of the imaging sensor 111 when imaging is performed without lighting under bright surroundings, and by an integrated light amount of illumination (lighting time in the case of constant light amount) when imaging is performed with lighting under dark surroundings. Therefore, in the adjustment of the imaging condition, at least one of the exposure time and the illumination lighting time may be adjusted.

It should be noted that what is obtained by Equation (3) is a target value of $I_n \times g_n$, and there are innumerable combinations of the values of $I_n$ and $g_n$ that satisfy this target value. Among them, specific values of $I_n$ and $g_n$ may be appropriately selected. As a basic idea, if the amplification factor $g_n$ of the imaging sensor 111 is made too large, noise contained in the image increases, and if the exposure time or the illumination lighting time is made too long, it may cause blur in the image. Therefore, instead of making either $I_n$ or $g_n$ excessively large, it is preferable to adjust both in a well-balanced manner.

On the other hand, when a relatively narrow brightness reference region 52 is used, the experiments by the inventor have revealed that relatively good adjustment can be achieved by determining the brightness index value $D_c$ based on a threshold between two classes obtained by classifying the sampled pixels into a black pixel class (first class of pixels with small pixel values, i.e., dark pixels) and a white pixel class (second class of pixels with large pixel values, i.e., bright pixels) based on the pixel values of the sampled pixels. In this case, the experiments by the inventor have also revealed that particularly good adjustment can be achieved by setting the brightness index value $D_c$ to a value that indicates a pixel value brighter (larger in this example) than the threshold, in particular, a value that indicates a pixel value brighter (larger in this example) than and near the threshold.

The classification into two classes can be performed, for example, by using a discriminant analysis method as follows.

First, when a certain value of a threshold n is provisionally set, as shown in FIG. 14, the number of pixels belonging to each class, and, for each class, the average and the variance of the pixel values of the pixels belonging to that class can be obtained. The average and the variance of the pixel values can also be obtained for all pixels. Then, based on these values, a within-class variance $\sigma_w^2$ shown in Math. 3 can be obtained. The within-class variance is a weighted average of the variances of the pixel values within each class, taking into account the number of pixels belonging to each class, and becomes smaller when the pixel values are concentrated within the separated classes.

[Math. 3]

$$\sigma_w^2 = \frac{N_1\sigma_1^2 + N_2\sigma_2^2}{N_1 + N_2}$$

On the other hand, a between-class variance $\sigma_b^2$ is defined as shown in Math. 4. The between-class variance is the remaining part of the variance of obtained for all pixels that is not represented by the within-class variance.

[Math. 4]

$$\sigma_b^2 = \sigma_t^2 - \sigma_w^2$$

Then, by calculating a degree of separation defined by Math. 5 for various values of the threshold n and obtaining the threshold n that maximizes this degree of separation, a threshold n that can most appropriately classify the two classes can be obtained. This substantially corresponds to obtaining a threshold n that minimizes the within-class variance.

[Math. 5]

$$\text{Degree of separation} = \frac{\sigma_b^2}{\sigma_w^2}$$

It should be noted that, in FIG. 14, a frequency distribution including a portion with a small frequency near the center of the gradation values is shown to make the boundary between the assumed classes easier to understand. However, even a frequency distribution that does not include such a portion can be subjected to classification by the discriminant analysis method. In addition, the threshold n obtained here may be different from the threshold used for binarization performed in the object extraction and decoding process 214.

When a relatively narrow brightness reference region 52 is used, it is preferable that the brightness index value $D_c$ be a value indicating a pixel value brighter than the threshold n. Moreover, it is more preferable that the brightness index value $D_c$ be in the vicinity of the threshold n, rather than being a value far from the threshold n, as in the above example.

Here, the purpose of setting the brightness index value $D_c$ in the vicinity of the threshold n is to perform adjustment so that the lowest brightness portion among the white region reaches the target brightness. In other words, the adjustment is intended to bring the white portion most buried in black to the brightness (pixel value) indicated by the target brightness index value Dr.

A criterion for how close the brightness index value $D_c$ should be to the threshold n can be determined, for example, based on the area ratio of thin bars contained in a barcode as defined by the barcode standard, when the read object is a barcode.

Pixels obtained by imaging white bars in a barcode are generally considered to belong to the white pixel class, but the pixel values of pixels obtained by imaging thin white bars tend to become smaller (darker) because such thin white bars are more likely to be buried between black bars on both sides, compared with thick white bars. Therefore, pixels obtained by imaging thin white bars are considered to be concentrated on the side with smaller pixel values (closer to the threshold n) within the white pixel class.

Accordingly, when the area ratio of thin to thick white bars is 30:70, particularly in a case where aiming has been established, and a narrow brightness reference region 52 is used, and a barcode is considered to be present throughout the entire brightness reference region 52, the brightness index value $D_c$ can be set to the pixel value of the thin white bars by placing it at a position not exceeding the lower 30% of the white pixel class in terms of the number of pixels.

Further, for another example, in the Code 128 standard, the character code "d" is represented by bars arranged in a black-white-black-white-black-white sequence, with thickness ratios of 1:4:1:2:2:1. Among them, there are three types of white bars sandwiched between black bars, and their width ratio is 4:2:1. The area of the thinnest white bar accounts for 1/(4+2+1)=14.2% of the white portions. Therefore, pixels obtained by imaging the thinnest white bar are considered to be concentrated in the lower 14.2% of the white pixel class in terms of the number of pixels. The brightness index value $D_c$ can be set to the pixel value of the thinnest white bar by placing it within this region.

The relationship between the number of pixels and the pixel values varies depending on the captured image. Thus, it is preferable to estimate, based on images obtained by imaging the assumed read object under various conditions, the region in which the pixel values of the thinnest white bars are distributed as described above, and to determine in advance how much higher than the threshold n the brightness index value $D_c$ should be placed in terms of pixel value in order to make the brightness index value $D_c$ fall within that region.

As one example, in the case of reading a barcode, the experiments by the inventor have revealed that preferable adjustment of the imaging condition can be achieved when the brightness index value $D_c$ is set to a pixel value that is greater than the obtained threshold n by approximately 5% of the maximum pixel value. In addition, for example, the pixel values may be divided into about 20 classes, and a class value of one class above the class to which the threshold n belongs may be used as the brightness index value $D_c$.

Furthermore, each time brightness adjustment is performed, a pixel value that is included in a predetermined lower ratio within the white pixel class may be obtained based on the distribution of pixel values within the white pixel class.

Similarly, in the case of reading a two-dimensional code or performing OCR, it is possible to determine how much higher than the threshold n the brightness index value $D_c$ should be placed based on the area ratio of the portion where the white appears most buried among the white portions appearing in the code symbol or character set to be read.

However, if the portion where the white appears most buried accounts for an extremely small ratio, determining the brightness index value $D_c$ based on this ratio is not necessarily useful. Nevertheless, by appropriately setting the brightness index value De to a value near the threshold n, such as the threshold n itself or a pixel value that is greater than the threshold n by approximately 5% of the maximum pixel value, and gradually increasing the target brightness index value Dr as described later, it is possible to search for an appropriate brightness.

Even when the brightness index value $D_c$ obtained as described above is used, a target value of $I_n \times g_n$ can be obtained in the same manner as described above in accordance with Equation (3). In addition, it is possible to use, as the target brightness index value $D_T$, a value similar to that in the case of the wide brightness reference region 51 (when aiming has not been established). In the case of the narrow brightness reference region 52 (when aiming has been established) using the discriminant analysis method, the value of the brightness index value $D_c$ tends to be smaller than that in the case of the wide brightness reference region 51, in which a pixel value close to the upper end is used as the brightness index value $D_c$. Therefore, if the same value is used as the target brightness index value $D_T$, it is considered that the image captured after adjustment will be brighter than in the case of the wide brightness reference region 51. The above relationship in magnitude of the brightness index value $D_c$, which results from the difference in the method of calculating the brightness index value $D_c$, does not necessarily hold true for all images, but is considered to hold almost certainly for an image for which reading of optical information is possible.

In the case of the narrow brightness reference region 52, since the imaging condition can be adjusted with attention focused on the image in the vicinity of the optical information, by performing such adjustment, only the portion of the optical information represented in black (a portion with low light reflectance) remains at a low pixel value, while other portions, including both the background and the portions represented in white (portions with high light reflectance), together have high pixel values. As a result, it is expected that the contrast of the optical information will be enhanced.

By determining the brightness index value $D_c$ based on the threshold obtained by classifying pixels into a dark pixel class and a bright pixel class with attention focused on the within-class variance, and performing adjustment using this index value as a reference, it is possible to perform the adjustment so that the pixel value of the portion of the optical information represented in black does not become excessively high. Therefore, it is possible to avoid a situation in which the image becomes excessively bright and even the black portion becomes bright pixels, making it indistinguishable from the white portion. This enables to accurately adjust the imaging condition to obtain an image with brightness suitable for reading.

In particular, in cases where the light reflectance of the background is relatively low or where bleeding occurs in the printing of the code symbol or the like, causing the white portion to become somewhat crushed, obtaining a bright image in this manner makes it possible to extract the black portion of the optical information from the image with high accuracy.

It should be noted that the within-class variance described here is merely one example of an evaluation function that represents the degree of variance of the pixel values within each class. It is not essential to take a weighted average in the evaluation function, and the variance of the pixel values of the pixels belonging to each class may be reflected in the evaluation function in another form. In addition, it is not essential that the brightness index value $D_c$ be a value indicating a pixel value brighter than the threshold between the classes. Although it is preferable that the brightness index value $D_c$ be in the vicinity of the threshold between the classes, the degree to which the brightness index value $D_c$ is brighter or darker than the threshold may be set by the user.

If the object extraction and decoding process 214 fails even when the imaging condition is adjusted using a target brightness index value $D_T$ of approximately the same level as that in the case of the wide brightness reference region 51, it is useful to perform the adjustment again using a higher target brightness index value Dr and retry the object extraction and decoding process 214.

In the optical information reading device 100, as shown in Table 1 and Table 2, a plurality of levels of target brightness index values $D_T$ are prepared for each reading mode. When the narrow brightness reference region 52 is used (i.e., when aiming has been established), the imaging condition is first adjusted using the lowest-level (level 0) target brightness index value $D_T$, and the object extraction and decoding process 214 is performed. If this fails, that is, if the reading of the optical information fails even in a state where aiming has been established, retries are performed while sequentially increasing the level (target level) and using higher target brightness index values $D_T$. The higher the level of the target brightness index value $D_T$, the higher the target level of brightness of the image. The reading mode may be set by the operator or automatically set by the optical information reading device 100 according to certain criteria. Table 1 is for reading code symbols, and Table 2 is for OCR (Optical Character Recognition).

TABLE 1

| Level | Target brightness index value [DN] |
|---|---|
| 0 | 600 |
| 1 | 720 |
| 2 | 864 |
| 3 | 920 |

TABLE 2

| Level | Target brightness index value [DN] |
|---|---|
| 0 | 768 |
| 1 | 920 |

If the object extraction and decoding process 214 fails even at the maximum level, next retry is performed from the minimum level in consideration of the possibility that the image has become too bright.

By performing such an operation, reading of the optical information can be successfully performed with a small number of retries, thereby shortening the time required to output the read result.

As described above, by using the wide brightness reference region 51 and the narrow brightness reference region 52 selectively, particularly by using the narrow brightness reference region 52 when aiming has been established, the imaging condition can be appropriately adjusted regardless of the environment in which the information to be read is placed, when analyzing the captured image and reading the optical information included in the image.

A retry of the object extraction and decoding process 214 after a read failure, with the imaging condition readjusted using a higher target brightness index value Dr when aiming has been established, also contributes to this effect.

When aiming has been established, the optical information of the read object is considered to be highly likely included within the brightness reference region. Therefore, by changing the target level of the brightness of the image after aiming has been established, the brightness of the image can be adjusted while reliably reflecting the contrast of the optical information, and it is considered that an image having a brightness suitable for reading can be obtained at one of the target levels. In this case, if the image is too bright, contrast information may be lost, which can lead to misreading. Accordingly, it is preferable that, after aiming has been established, attempts of the object extraction and decoding process 214 be started from an image that is not excessively bright.

If the target level of the brightness of the image is changed before aiming has been established, the image may become too bright and cause halation, making it difficult to determine whether aiming has been established. From this viewpoint as well, it is useful to avoid making the image too bright while aiming has not been established.

The above effects become more significant when the brightness reference region is changed to the narrow brightness reference region 52 after aiming has been established, but implementing this change at the same time is not essential.

In the reading device 100, regardless of which of the above-described methods is used to obtain the brightness index value $D_c$, an upper limit is defined for the exposure time when illumination is not turned on in determining a specific imaging condition based on the target value of $I_n \times g_n$. This upper limit can be determined based on the movement amount of the imaging sensor 111 per frame obtained in the aiming state determination process 220. Specifically, it can be determined as follows.

First, the movement amount of the imaging sensor 111 per frame can be obtained from the magnitude of the movement vector of each frame. At this time, data of a number of frames corresponding to the predetermined number used as a reference in step S40 of FIG. 9 may be aggregated, or data of a different number of frames may be aggregated. The average value of the aggregated data may be used, or the maximum value, the median value, the most recent value, or the like may be used. The movement amount obtained in this manner is denoted as x [pixel].

Here, if the length of one frame is denoted as $t_f$ and the exposure time per frame as $t_{exp}$, the movement amount $p_x$ [pixel] during the exposure time can be expressed as follows:

$$p_x = t_{exp} / t_f \times x \tag{4}$$

On the other hand, if the allowable blur amount of the image, i.e., the blur amount allowable for reading the optical information, is denoted as p [pixel], the following inequality is required to be satisfied:

$$p > p_x = t_{exp} / t_f \times x \tag{5}$$

Rearranging this yields:

$$p / x \times t_f > t_{exp} \tag{6}$$

It is therefore understood that the upper limit of the allowable exposure time is determined by $p/x \times t_f$.

For example, if the allowable blur p is 1 [pixel] and the length $t_f$ of one frame is 10 [ms], the upper limit of the allowable exposure time according to the amount of movement x [pixel] of the imaging sensor 111 per frame can be defined as shown in Table 3 below. Of course, the upper limit of the exposure time may be a continuous value obtained by substituting the numerical value of the movement amount into the left side of Equation (6), instead of such discrete values. An upper limit of the allowable exposure time for cases where the movement amount is more than 10 pixels may also be defined.

TABLE 3

| Amount of movement x [pixel] | Upper limit of allowable exposure $p_{exp}$ [μs] |
|---|---|
| 1 | 10000 |
| 2 | 5000 |
| 3 | 3333 |
| 4 | 2500 |
| 5 | 2000 |
| 6 | 1666 |
| 7 | 1428 |
| 8 | 1250 |
| 9 | 1111 |
| 10 | 1000 |

In determining the integrated light amount $I_n$ and the gain $g_n$ to be used for the next imaging, by determining them such that the exposure time does not exceed the upper limit corresponding to the movement amount x, the imaging condition can be appropriately adjusted to prevent a situation in which the optical information cannot be read due to blur even if the brightness is appropriate.

That is, particularly when the amount of movement of the imaging sensor 111 is small, a wide range of options for the exposure time can be taken. In particular, in a case where the read object is located at a distance in a dark environment, it may be difficult to capture an image bright enough for reading with an exposure time of about 1000 μs (microseconds), and allowing a longer exposure time to be set greatly contributes to improving the success rate of reading.

The above-described upper limit of the exposure time can be similarly applied both when aiming at the optical information has been established and when it has not.

The allowable blur amount p depends on factors such as the size of the elements constituting the optical information in the image, the complexity of the optical information, and the contrast and noise of the image. This value is preferably preset in consideration of a standard usage environment of the reading device 100.

For example, assuming that the smallest element of the code symbol of the read object (such as a bar of a barcode or a dot of a two-dimensional code) fits within one pixel, it is conceivable to preset the allowable blur amount p to 0.5 [pixel]. Individual values may also be prepared according to combinations of the distance to the read object and the type of the read object. When super-resolution below one pixel per element is performed, the allowable blur amount p may be set to a value smaller than 0.5 [pixel].

The lighting time when illumination is turned on can be considered in the same manner. In this case, even if there is a period of exposure without lighting, the effect of the exposure during that period on the image is relatively small. Further, the exposure time is usually set to a value close to the lighting time. Therefore, the upper limit of the lighting time may also be defined in the same manner as described above.

Figure 15:
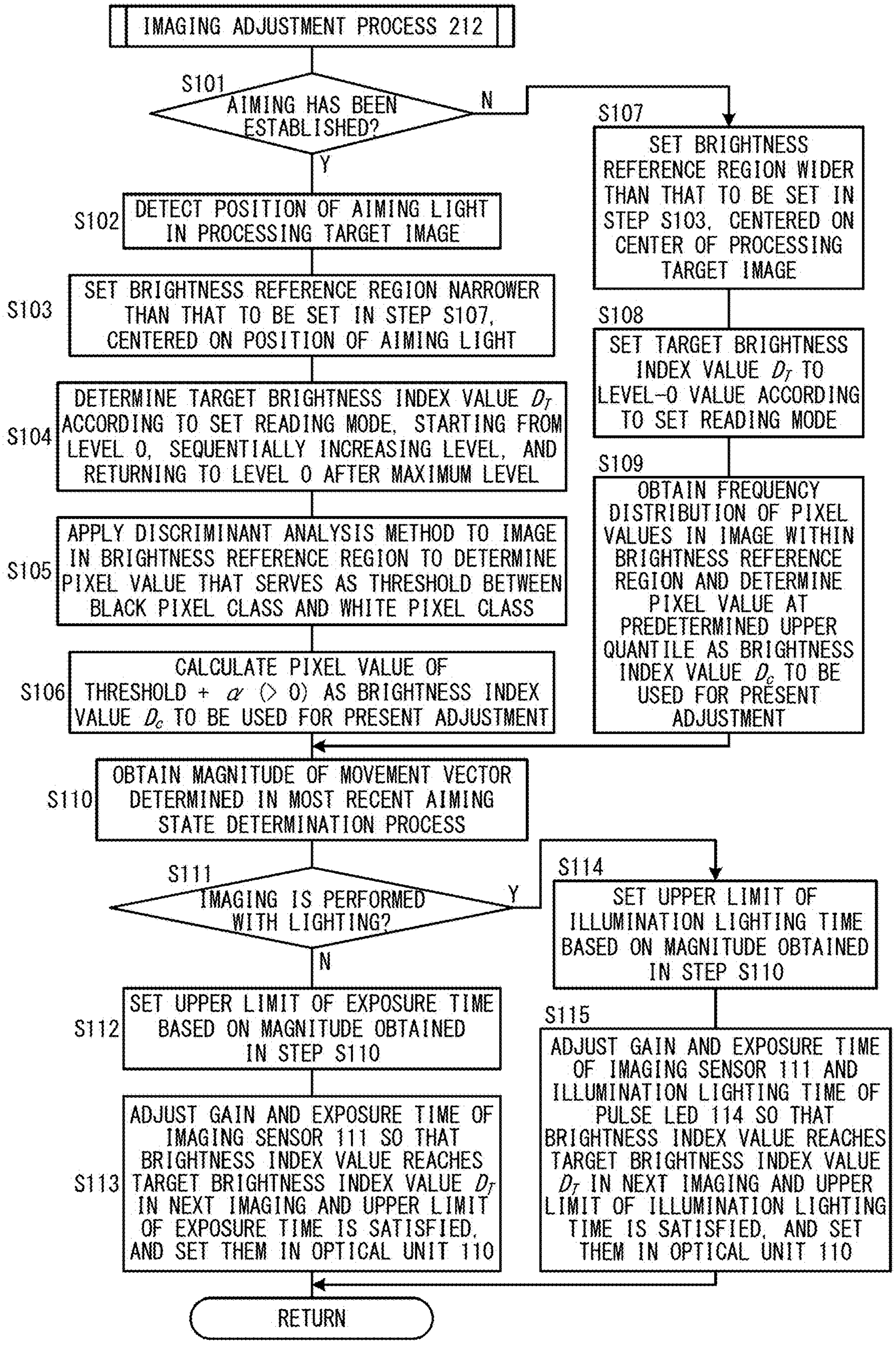
FIG. 15 is a flowchart of the imaging adjustment process 212 executed during the process shown in FIG. 12.

Next, FIG. 15 shows a flowchart of the imaging adjustment process 212 described above. This process is executed at step S83 in FIG. 12 as described above, and steps of this process correspond to an imaging adjustment step. In this process, the CPU 121 functions as an imaging adjustment part.

In the imaging adjustment process 212, the CPU 121 first determines whether aiming has been determined as established in the aiming state determination process 220 shown in FIG. 9 and FIG. 10 (S101).

If aiming has been determined as established, the CPU 121 detects the position of the aiming light 53 in the processing target image (S102) and sets a brightness reference region 52, which is narrower than the one to be set in step S107, centered on the position of the aiming light 53 (S103). The CPU 121 also determines the target brightness index value $D_T$ according to the set reading mode, such that the level starts from level 0, is sequentially increased, and returns to level 0 after the maximum level (S104; see Table 1 and Table 2).

The detection of the position of the aiming light 53 may be performed using any known technique as appropriate. For example, the techniques disclosed in PTL 6 to PTL 8 may be adopted. Step S102 corresponds to an aiming light detecting step, and in this step, the CPU 121 functions as an aiming light detecting part. Step S104 corresponds to a target adjustment step, and in this step, the CPU 121 functions as a target adjustment part.

Next, the CPU 121 applies the above-described discriminant analysis method to the image in the brightness reference region 52 set in step S103, and obtains the pixel value of a threshold n that serves as a boundary between the black pixel class and the white pixel class (S105). Then, the CPU 121 calculates, as the brightness index value $D_c$ to be used for the present adjustment, a pixel value of n+α (α>0) (S106).

On the other hand, if aiming has not been determined as established in step S101, the CPU 121 sets a brightness reference region 51, which is wider than the one to be set in step S103, centered on the center of the processing target image (S107). The CPU 121 also sets the target brightness index value Dr to a level-0 value according to the set reading mode (S108).

Next, the CPU 121 obtains a frequency distribution of pixel values of the pixels in the image within the brightness reference region 51 set in step S108, and determines, as the brightness index value De to be used for the present adjustment, a pixel value corresponding to a predetermined upper quantile (S109).

After step S106 or S109, the CPU 121 obtains the magnitude of the movement vector determined in the most recent aiming state determination process (S110). As described above, any appropriate aggregation method, such as an average or a maximum, may be used.

If imaging is performed without turning on illumination (No in S111), the CPU 121 sets an upper limit of the exposure time based on the magnitude of the movement vector obtained in step S110 (S112). For this setting, Equation (6) described above may be used, for example. Then, the CPU 121 adjusts the gain and the exposure time of the imaging sensor 111 so that the brightness index value is expected to reach the target brightness index value Dr in the next imaging while satisfying the upper limit of the exposure, and sets the adjusted values in the optical unit 110 (S113). Thereafter, the process returns to the original flow.

On the other hand, if imaging is performed with lighting (Yes in S111), the CPU 121 sets an upper limit of the illumination lighting time based on the magnitude of the movement vector obtained in step S110 (S114). Also for this setting, Equation (6) described above may be used, for example. Then, the CPU 121 adjusts the illumination lighting time of the pulse LED 114, as well as the gain and the exposure time of the imaging sensor 111, so that the brightness index value is expected to reach the target brightness index value Dr in the next imaging while satisfying the upper limit of the illumination lighting time, and sets the adjusted values in the optical unit 110 (S115). Thereafter, the process returns to the original flow.

Through the above process, the reading device 100 can perform the adjustment of the imaging condition described with reference to FIG. 13A, FIG. 13B, and FIG. 14.

In this adjustment, the target brightness index value Dr is set to the initial value, i.e., level 0, when aiming has not been established, and when reading fails in a state where aiming has been established and the imaging adjustment process 212 is repeated, the target brightness index value Dr is set to progressively higher levels.

In a case where imaging is performed with lighting, it is also conceivable to set an upper limit of the exposure time simultaneously with or instead of the upper limit of the illumination lighting time. For example, when the distance to the read object 101 is so great that the light does not reach it, or when the lighting amount or lighting time is otherwise limited to suppress glare, the exposure time may be adjusted to capture an image with brightness more suitable for reading even when lighting is used. In such adjustment, it is preferable to set the upper limit of the exposure time in order to prevent blurring.

FIG. 16A to FIG. 16D and FIG. 17A to FIG. 17D illustrate examples of images that are processing targets of each instance of the reading process 210 when the reading process 210 is retried multiple times while the imaging adjustment process 212 shown in FIG. 15 is repeatedly executed.

Figure 16A:
FIG. 16A to FIG. 16C are diagrams respectively illustrating examples of images to be processed in each retry of the reading process 210 when the reading process 210 is retried multiple times while executing the imaging adjustment process 212.

FIG. 16A shows an example of an image which was the processing target in the second reading process 210 executed in the reading routine restarted at step S19 in FIG. 5 after aiming had been established. This corresponds to a case where the processing target image in the first reading process 210 was captured under the imaging condition adjusted before aiming had been established, and the reading process 210 was retried after a read failure in the first reading process 210.

In this case, during the imaging adjustment process 212 in the first reading process 210, the brightness index value and the target brightness index value are determined in steps S102 to S106, and the imaging condition is adjusted according to these values. Since a level-0 target brightness index value is used initially, the image shown in FIG. 16A, which was the processing target in the second reading process 210, is an image captured under an imaging condition adjusted using the level-0 target brightness index value.

In the example of FIG. 16A, reading of a two-dimensional code is attempted, and only the image around the code symbol is shown in the figure. As can be seen from the figure, the code symbol to be read is in a somewhat collapsed printing state. In the state of FIG. 16A, the image is quite dark, and thus the distribution of black and white elements in the code symbol is unclear.

Figure 16B:
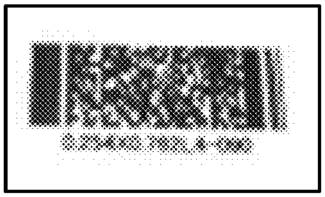

FIG. 16B shows an example of an image that was the processing target in the third reading process 210 following FIG. 16A. This image was captured under the imaging condition adjusted using a level-1 target brightness index value in the imaging adjustment process 212 during the second reading process 210. As can be seen from the figure, the entire image is brighter than in FIG. 16A, the background is almost white, and the contrast between the white elements and the black elements of the code symbol is greater, but the white elements are still somewhat buried, making successful reading difficult.

Figure 16C:
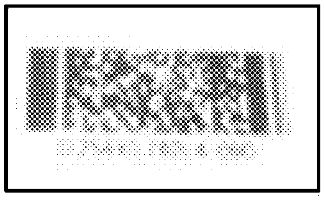
Figure 16D:
FIG. 16D is a diagram illustrating an enlarged view of the image shown in FIG. 16C.

FIG. 16C shows an example of an image that was the processing target in the fourth reading process 210 following FIG. 16B. This image was captured under the imaging condition adjusted using a level-2 target brightness index value in the imaging adjustment process 212 during the third reading process 210. The image shown in FIG. 16D is an enlarged view of the image of FIG. 16C. As can be seen from the figures, the entire image of FIG. 16C is brighter than the image of FIG. 16B, and as shown in FIG. 16D, the contours of the white elements are relatively clear. In this state, successful reading can be sufficiently expected, and indeed, in experiments where this image was captured, reading succeeded in the fourth reading process 210.

FIG. 17A to FIG. 17D show images respectively corresponding to those in FIG. 16A to FIG. 16D, in a case where reading of a two-dimensional code printed on a dark-colored carrier is attempted.

Figure 17A:
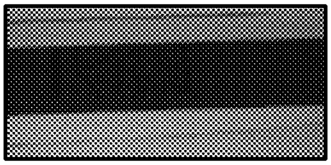
FIG. 17A to FIG. 17D are diagrams respectively corresponding to FIG. 16A to FIG. 16D and illustrating other examples of images to be processed.
Figure 17B:
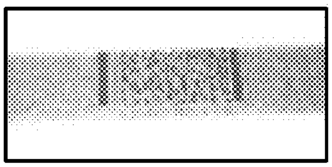
Figure 17C:
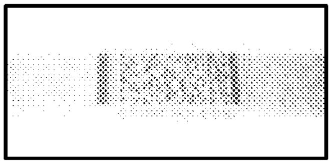
Figure 17D:
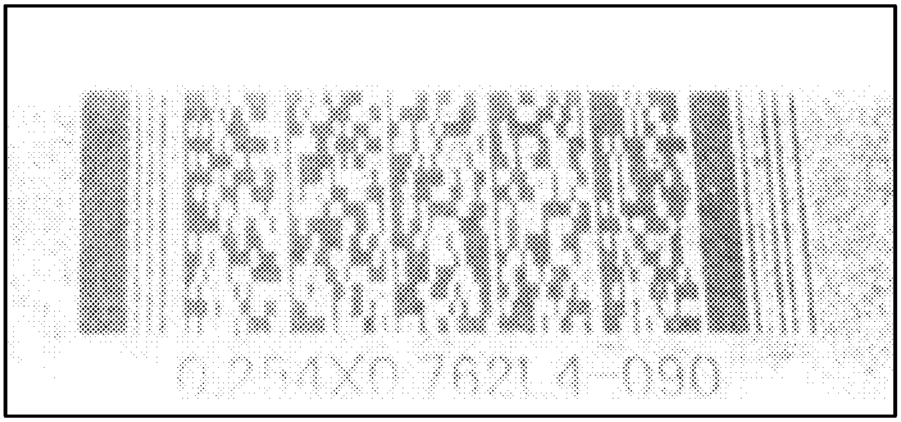

In this case, in the image of FIG. 17A captured under the imaging condition adjusted using a level-0 target brightness index value, the black elements of the code symbol are almost indistinguishable from the background color. However, as the level of the target brightness index value is increased, the contrast becomes higher, and as shown in FIG. 17C and FIG. 17D, in the image captured under the imaging condition adjusted using a level-2 target brightness index value, the black elements and the white elements can be distinguished at a level sufficient for decoding. In fact, in an experiment in which this image was captured, reading succeeded in the fourth reading process 210 in which the image shown in FIG. 17C and FIG. 17D was the processing target.

As described above, by performing the imaging adjustment process 212 described with reference to FIG. 13A to FIG. 15, the imaging condition can be adjusted so that even optical information that is difficult to read due to collapsed printing or contrast issues can nevertheless be successfully read.

This adjustment is possible because, by detecting a state in which aiming at the optical information has been established, and by adjusting the imaging condition, in the aiming established state, based on the characteristics of the image in the vicinity of the optical information to be read, so that an image having sufficient brightness is obtained, it is possible to set an imaging condition with aggressively increased brightness compared to a case where the imaging condition is adjusted based on the characteristics of a wide area of the image.

When such a condition is set, if the gain of the imaging sensor 111 is set to a low value to avoid noise, the exposure time (or the illumination lighting time) may become excessively long, which can cause a read failure due to blur. However, since the upper limit of the exposure time is separately set based on the movement amount of the imaging sensor 111, a read failure due to blur can also be prevented.

Figure 18A:
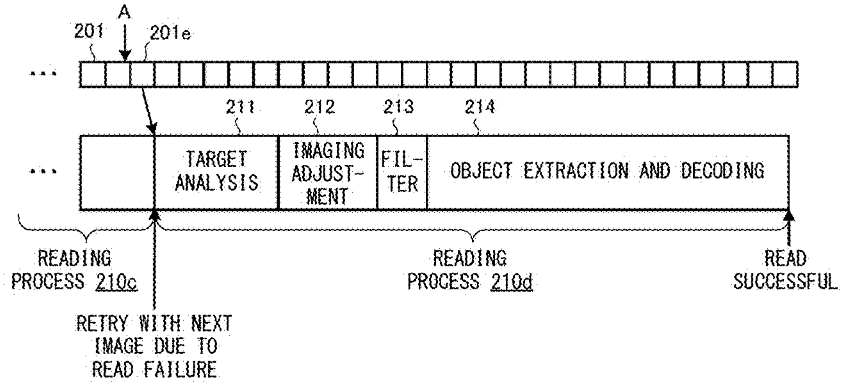
FIG. 18A and FIG. 18B are diagrams illustrating respective examples of execution timing of the reading process in a comparative example of the present invention, respectively corresponding to FIG. 4A and FIG. 4B.
Figure 18B:
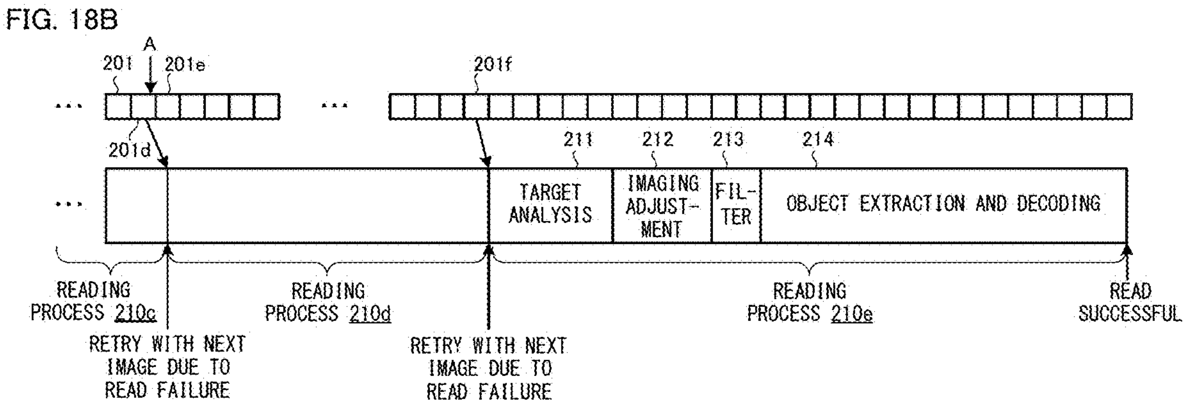

Next, FIG. 18A and FIG. 18B respectively show the execution timing of the reading process in a comparative example of the present invention, in the same format as FIG. 4A and FIG. 4B. In the description of the comparative example, portions common to or corresponding to those of the reading device 100 of the embodiment described above are denoted by the same reference signs as those used for the reading device 100.

The comparative example described here differs from the embodiment described above only in that the aiming state determination process 220 is not performed and, therefore, the restart of the reading process 210 triggered by the establishment of aiming is not performed.

Even in this case, if the reading process 210 is executed on an image captured in a frame after the timing indicated by arrow A described with reference to FIG. 4A and FIG. 4B, at which the reading device 100 is kept (substantially) stationary, the reading is expected to succeed to a degree similar to that in the cases shown in FIG. 4A and FIG. 4B.

For example, as shown in FIG. 18A, if the reading process 210*c* ends in a read failure immediately after imaging of the frame 201*e* immediately following the timing indicated by arrow A, a subsequent reading process 210*d* can be started immediately with the image captured in the frame 201*e* as the processing target. In this reading process 210*d*, reading is expected to succeed to a degree similar to that in the reading process 210*b* shown in FIG. 4A. In this case, the time required from the timing indicated by arrow A until a read result is obtained can also be expected to be similar to that in the case of FIG. 4A.

On the other hand, as shown in FIG. 18B, if the reading process 210*c* ends in a read failure immediately after imaging of the frame 201*d* including the timing indicated by arrow A, the reading process 210*d* is started at this timing with the image captured in frame 201*d* as the processing target. In this case, even if the imaging of the subsequent frame 201*e* immediately following the timing indicated by arrow A is completed, the next reading process 210*e* cannot be started until the reading process 210*d* is completed. In addition, even if the image of frame 201*d* is used as the processing target, successful reading cannot be expected because the reading device 100 has not yet been kept stationary.

As a result, after completion of the reading process 210*d*, the reading process 210*e* is started with the image captured in the latest frame 201*f* at that time as the processing target, and successful reading similar to that in the reading process 210*b* shown in FIG. 4A can only be expected in the reading process 210*e*.

In this case, the time required to obtain a read result from the timing indicated by arrow A is considered to be longer than that in the case of FIG. 4A by approximately the time required for the reading process 210*d*. In a case where the processing load of the reading process 210*d* is relatively large and each reading process 210*d* takes a certain amount of time, this time is expected to be longer than a predetermined time range T, which is the difference in required time between the case of FIG. 4B and the case of FIG. 4A.

Here, an estimate is made of the average time required from the timing indicated by arrow A until a read result is obtained for three cases: this comparative example; the above-described embodiment; and a first modification example of the above-described embodiment in which the reading process 210*b* is always newly started at the timing indicated by arrow B in FIG. 4A and FIG. 4B, where it is determined that aiming has been established.

In this estimation, the following assumptions (a) to (d) are made:

(a) How far the reading process 210 being executed has progressed at the timing of arrow A is random.

(b) If the reading process 210 is executed using an image captured in a frame after the timing indicated by arrow A as the processing target, reading succeeds, whereas if it is executed using an image captured in a frame before that timing as the processing target, reading fails.

(c) The time required for the reading process 210 in the case of a read failure is defined as f, and the time required in the case of a read success is defined as s. Generally, in the case of a read failure, the process attempts searching and decoding over the entire image area before determining failure, so it takes longer than in the case of a read success, and thus $s<f$.

(d) The length of the predetermined time range T (which is approximately the same as the time from the timing indicated by arrow A until the aiming state determination process 220 determines that aiming has been established) is defined as a.

First, in the comparative example, the required time is shortest, s, in the case of FIG. 18A (only the time for the successful reading process 210*d*). Strictly speaking, one frame period is added to this, but it is ignored here for simplicity of explanation. The same applies to the case of FIG. 4B. The required time is longest, $f+s$, in the case of FIG. 18B (the sum of the time for the unsuccessful reading process 210*d* and the successful reading process 210*e*). Accordingly, the average required time T1 is $(f+2s)/2$.

Next, in the first modification example, the required time is always the same as that in FIG. 4B. The required time directly represents the average required time, and the average required time T2 is $a+s$ (the sum of the predetermined time range T and the time for the successful reading process 210*b*).

Here, since $T2-T1=f/2-a$, if the aiming state determination process 220 can determine that aiming has been established, in less than half the time f, it is considered that the required reading time can be reduced compared with the comparative example even if the reading process 210*b* is always newly started at the timing indicated by arrow B.

Next, in the above-described embodiment, the probability that restart does not occur as in FIG. 4A is $a/f$, and the probability that restart occurs as in FIG. 4B is $1-a/f$.

The required time in the case where restart does not occur ranges from s at the shortest, in the case of FIG. 4A, to $a+s$ at the longest, in the case where the reading process 210*b* is started immediately before the timing indicated by arrow B (which is almost the same as the case of FIG. 4B). Accordingly, the average required time in the case where restart does not occur is a/2+s.

The average required time in the case where restart occurs is the same as that in the first modification example, a+s.

Accordingly, the average required time T3 in the above-described embodiment is:

$$T3 = (a/f)(a/2+s) + (1-a/f)(a+s)$$
$$= a + s - a^2/2f$$

Here, since $T3-T1=(f-a)^2/2f$, according to the above-described embodiment, if the aiming state determination process 220 can determine that aiming has been established, in less than the time f, it is considered that the required reading time can be reduced compared with the comparative example. This condition is less stringent than in the case of the first modification example. It can also be seen that the larger f is, that is, the longer the reading process 210 takes, and the shorter (or the fewer frames) it takes to determine that aiming has been established, the greater the effect of reducing the required time.

Furthermore, if a exceeds f, the reading process 210 is considered to have been completed at least once by the time when aiming is determined to have been established after the timing indicated by arrow A, and the reading process 210 using an image captured after the timing indicated by arrow A as the processing target is considered to be in progress at the timing indicated by arrow B. In this case, restarting of the reading process 210 is unnecessary, and the operation becomes substantially the same as in the comparative example.

Therefore, even if the reading process 210 is a light process and f<a holds, no disadvantage arises compared with the case of the comparative example, except that a slight additional load is imposed by the aiming state determination process 220. If it is expected that f<a holds because the reading process 210 is known to be a light process, for example depending on the selected reading mode, the aiming state determination process 220 may be omitted.

Modification Example

The embodiment described above are merely illustrative, and the present invention is not limited to the specific configuration of the device, specific processing procedures, parameter values, types of optical information to be read, required times of each process, and so on described in the embodiment.

Among the functions included in the reading device 100 of the embodiment described above, the following functions: the function of restarting the reading process 210 according to the result of the aiming state determination process 220; the function of changing the size of the brightness reference region or the method of obtaining the brightness index value and the target brightness index value based on whether aiming has been established; the function of increasing the target level of brightness adjustment if reading fails while aiming has been established; and the function of defining an upper limit of the exposure time or the illumination lighting time according to the movement amount of the imaging sensor 111, may each be implemented independently or in any combination. In addition, the target analysis process 211 and the filter process 213 in the reading process 210 are not essential.

In the embodiment described above, the example has been described in which, when the reading process 210 is restarted, an image captured in the most recent frame is used as the processing target. However, this is not essential, and an image captured in any frame within the predetermined time range T after the timing indicated by arrow A in FIG. 4B may be used as the processing target. Although it is not preferable because the start of the reading process 210 is delayed, it is also possible to use an image captured in a frame after the predetermined time range T.

In the embodiment described above, once it is determined that aiming has been established, the aiming state determination process 220 is no longer performed thereafter. However, it is conceivable that after aiming has been established, the operator moves the reading device 100 significantly so that aiming is lost, and aiming is then established again. In consideration of this, the aiming state determination process 220 may be continued even after aiming has once been established.

Figure 19:
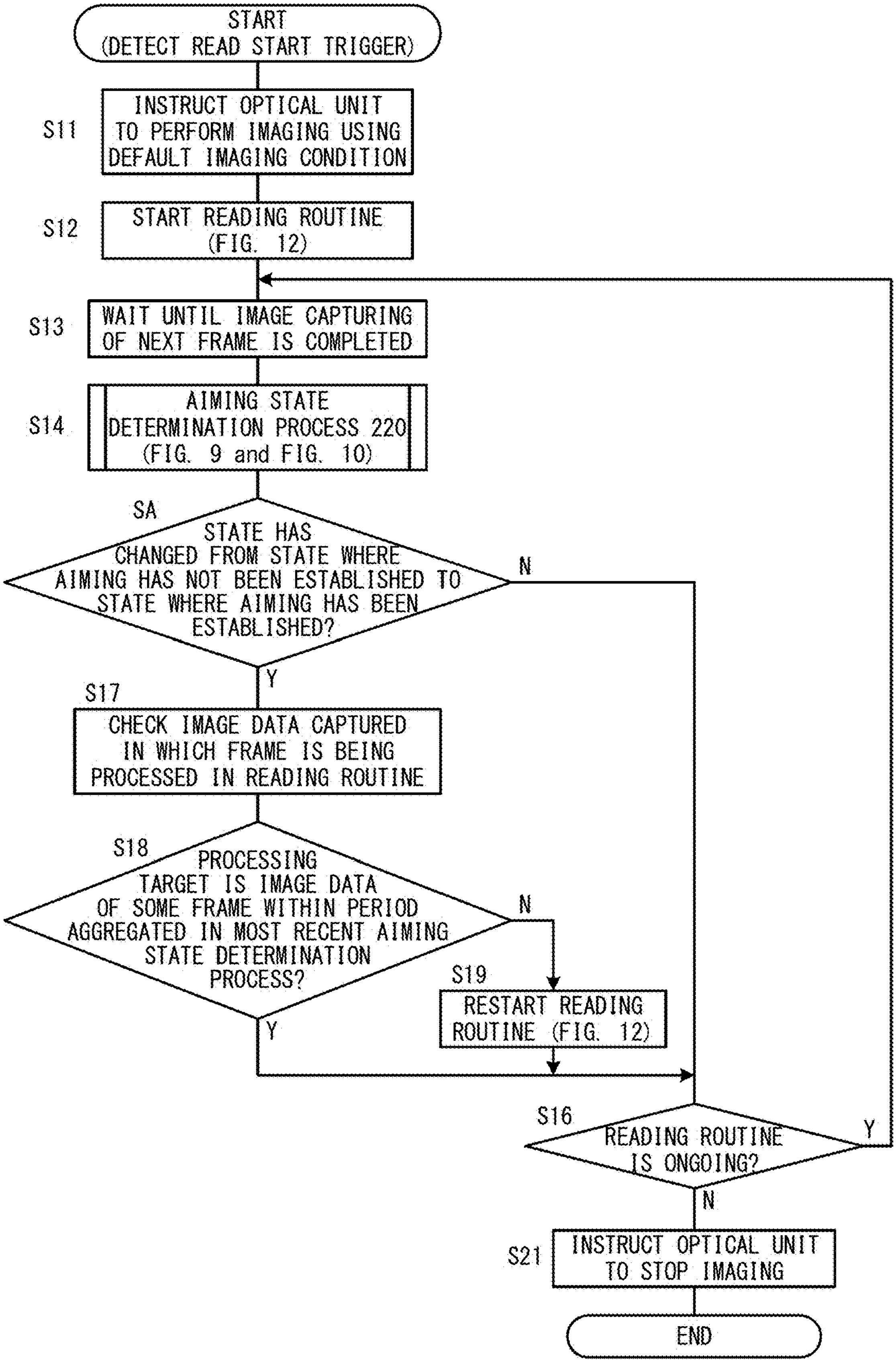
FIG. 19 is a flowchart of a process corresponding to that shown in FIG. 5, executed by the CPU 121 of the reading device 100 according to a modification example of the present invention when a read start trigger is detected.

FIG. 19 shows a flowchart of a process corresponding to FIG. 5 in a case where this modification is applied. The differences between the processing in FIG. 19 and the processing in FIG. 5 are as follows.

First, instead of step S15, step SA is executed to determine whether the state has changed from a state where aiming has not been established to a state where aiming has been established. This is to perform the restart-related processing of steps S17 to S19 at the timing of this change. When step S19 is executed for the second and subsequent times, the retry count in step S88 of the reading routine may be carried over from the previous count.

Another difference from FIG. 5 is that, when the determination in step S18 is affirmative or after step S19 is completed, the process proceeds to step S16 instead of step S20.

In the above modification, it is conceivable that aiming changes to a state where it is no longer established after once having been established. In this case, in the imaging adjustment process shown in FIG. 15, step S108 may be executed after the level of the target brightness index value $D_T$ has been raised to 1 or higher in step S104. In such a case, the target brightness index value $D_T$ is preferably once reset to level 0 in step S108, and then restarted from level 0 again when step S104 is next executed.

As another modification, it is also conceivable that the reading routine (reading process 210) is always restarted if aiming has not been established when a time corresponding to the predetermined time range T has elapsed since the start of the reading routine.

Figure 20:
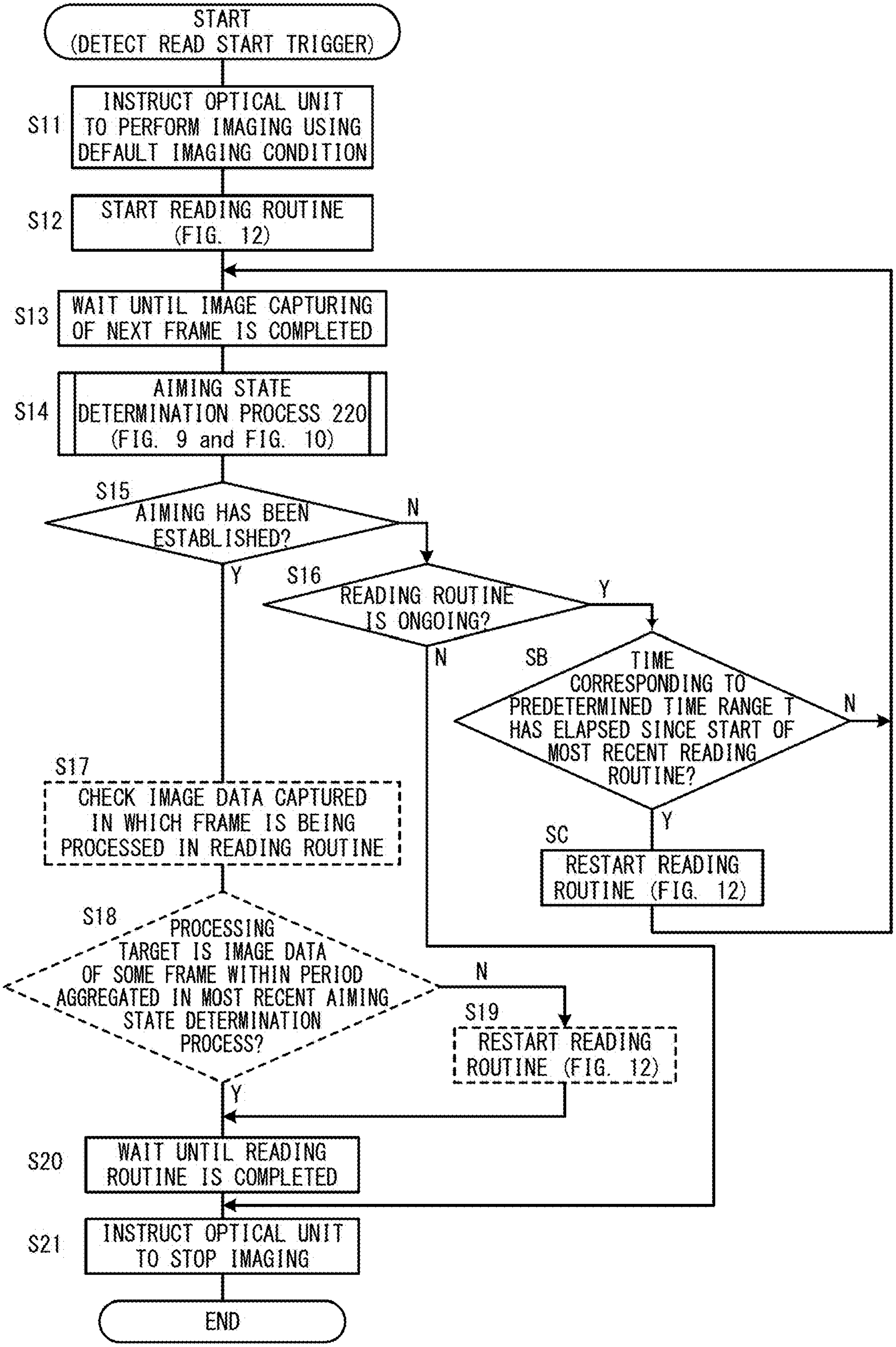
FIG. 20 is a flowchart of a process corresponding to that shown in FIG. 5, executed by the CPU 121 of the reading device 100 according to another modification example of the present invention when a read start trigger is detected.

FIG. 20 shows a flowchart of the process corresponding to FIG. 5 in a case where this modification is applied. The differences between the process in FIG. 20 and that in FIG. 5 are as follows.

First, when aiming has not been established and the process proceeds from step S15 to step S16, and it is determined that execution of the reading routine is ongoing, the CPU 121 determines in step SB whether a time corresponding to the predetermined time range T has elapsed since the most recent start of the reading routine. This time may be set to be slightly shorter than T. If the time has elapsed, the CPU 121 restarts the reading routine in step SC, after which the process returns to step S13 and is repeated. If the time has not elapsed in step SB, the process directly returns to step S13 and is repeated.

When the process shown in FIG. 20 is executed, at the time aiming is established, the reading process 210 is necessarily within a time corresponding to the predetermined time range T from its start, and at that time point the processing target is necessarily image data of some frame within the period (the predetermined time range T) aggregated in the most recent aiming state determination process 220 (the criterion for the determination in step SB is defined so that this holds true also in consideration of the length of frame). Therefore, it is considered that there is no case where the restart of the reading routine in step S19 is required, and accordingly steps S17 to S19 need not be executed. However, they may be executed as a precaution.

In the above process, the processes of steps SB and SC correspond to a first reading control step, and the process of step S15 corresponds to a second reading control step, which are associated with the functions of a first reading controller and a second reading controller, respectively.

In the above modification, it is not necessary to restart the reading process 210 at the time when aiming is established, and the operation as shown in FIG. 4A will occur with a probability of 1 when aiming is established.

Therefore, if the average required time T4 from the timing indicated by arrow A until a reading result is obtained in this modification is estimated in the same manner as T1 to T3 described above, $$T4 = a/2 + s$$

holds.

Accordingly, since T3–T4=a (f–a)/2f, if it is possible to determine that aiming has been established by the aiming state determination process 220 in a time shorter than f (if f>a holds), the required time for reading can be further reduced compared with the embodiment described above.

However, in this modification, before aiming has been established, the reading process 210 is restarted without waiting for its completion. For this reason, except for special cases where successful reading occurs within the predetermined time range T, reading will not succeed before aiming is established.

Since successful reading is generally unlikely before aiming is established, this point will not cause a significant disadvantage in many cases. Nevertheless, attention should be paid to this point when adopting this modification.

Figure 21:
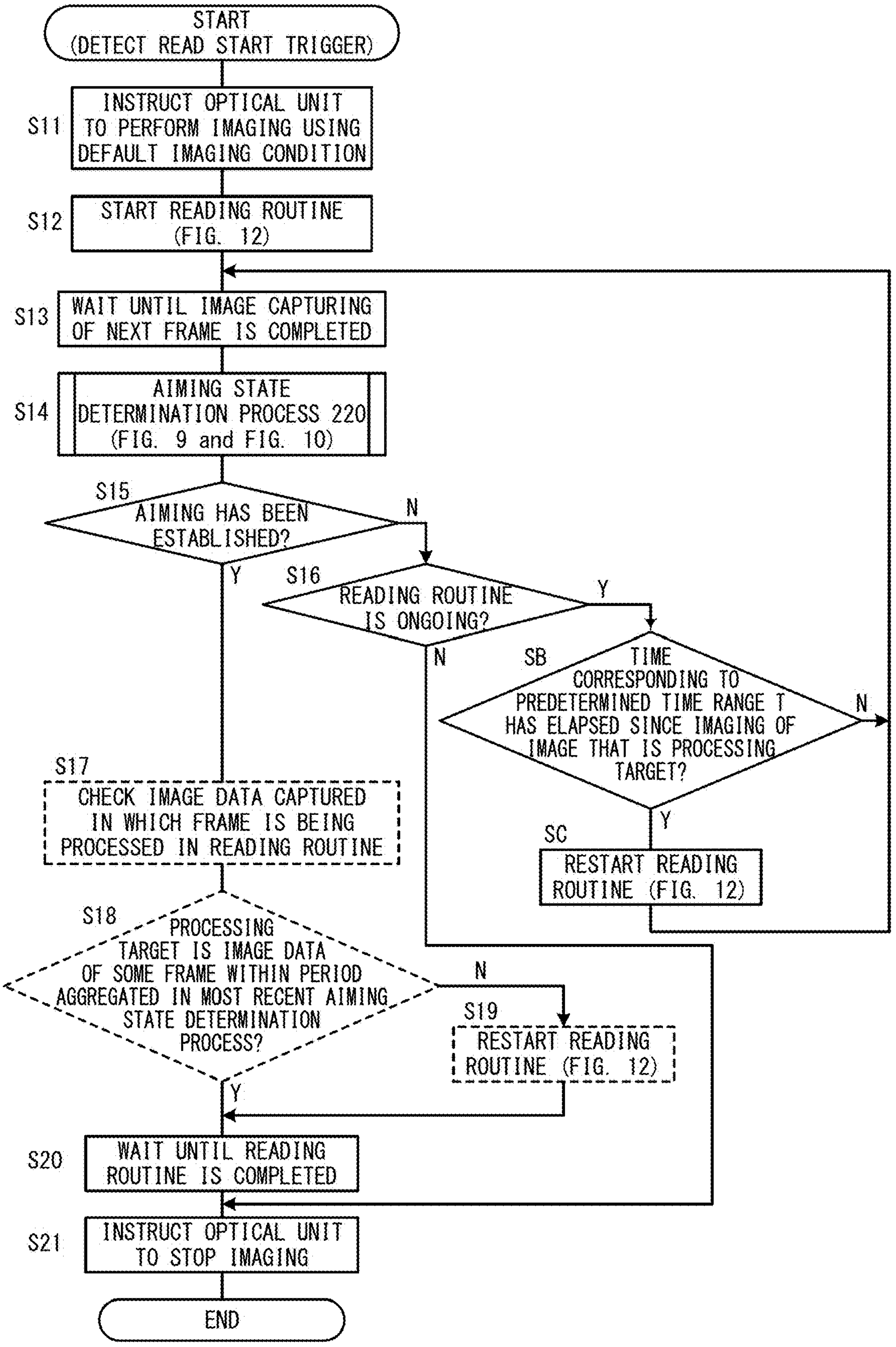
FIG. 21 is a flowchart corresponding to FIG. 20 showing a process executed by the CPU 121 in still another modification example.

It should be noted that the determination in step SB may alternatively be made based on the imaging timing of the image that is the processing target in the reading routine being executed, as shown in FIG. 21. That is, the reading routine may be restarted in step SC when a time corresponding to the predetermined time range T has elapsed from this imaging timing. Even in this case, at the point when aiming is established, the image data of a frame within the period aggregated in the most recent aiming state determination process 220 is always used as the processing target of the reading process 210.

When the determination in step SB is made based on the imaging timing, the image data to be the processing target in the reading routine restarted in step SC does not necessarily have to be the image of the latest frame. Using image data captured before the latest frame shortens the time from the start of the reading routine until step SB becomes affirmative and the reading routine is restarted. However, if image data captured within the predetermined time range T before the restart timing is used, an effect equivalent to that in the case of using the image date of the latest frame can be obtained in terms of reducing the required time for reading.

As another modification, the classification of pixels for obtaining the brightness index value $D_c$ may be performed by a method different from that in the embodiment described above.

For example, based on the assumption that the distributions of pixel values of pixels capturing the black portions of a code symbol or characters and those capturing the white (or background) portions thereof both follow a normal distribution, the classification may be performed by statistically determining a threshold that minimizes the value representing an average misclassification rate (sum of the probability that a pixel capturing a black portion is classified into the bright pixel class and the probability that a pixel capturing a white portion is classified into the dark pixel class), when all pixels are classified into a dark pixel class and a bright pixel class using a single threshold.

Specifically, this classification can be performed by determining a threshold n that minimizes the value of J in Math. 6 below.

[Math. 6]

$$J = \omega_1 \log(\sigma_1/\omega_1) + \omega_2 \log(\sigma_2/\omega_2)$$

$$\text{where: } \omega_1 = N_1/N_t,\ \omega_2 = N_2/N_1$$

The meanings of the variables are shown in FIG. 14. σ denotes the standard deviation corresponding to each variance shown in FIG. 14.

Even when the brightness index value $D_c$ is determined based on the threshold n obtained by such a method, substantially the same effects as those in the above-described embodiment can be obtained with respect to adjustment of the imaging condition. By calculating the variance of pixel values of pixels classified into each class for various candidate thresholds and performing the classification based on the obtained variance, a meaningful threshold n for determining the brightness index value $D_c$ can be obtained.

It is useful to perform the classification so that the variance of the pixel values within each class is minimized, as in the above-described embodiment, and it is also useful to perform the classification so that the average misclassification rate is minimized, as in this modification example. Other criteria may also be used. As long as classification is performed so that pixels capturing black portions are classified into the dark pixel class and pixels capturing white portions or background are classified into the bright pixel class as much as possible, the specific algorithm is not limited. The classification accuracy does not have to be strict. To perform such classification, it is useful to perform classification at least based on the variance of the pixel values of pixels classified into each class.

As still another modification, the functions of the reading device 100 in the embodiment described above may be distributed among a plurality of devices, and for example, some of the functions illustrated in FIG. 2 and the like may be provided in a data processing device to be connected to the reading device 100.

The reading device 100 may be a handheld type used by an operator, or a stationary type in which the read object 101 is mainly moved to align it with the imaging range of the imaging sensor 111. The embodiment described above is applicable regardless of whether aiming is established by moving the reading device 100, by moving the read object 101, or by moving both. The movement of the imaging sensor 111 may be regarded as relative movement with respect to the read object 101 or the optical information carried thereon.

Further, in the determination of whether aiming has been established in the aiming state determination process 220, it is not essential to take into account the movement range or movement trajectory of the imaging sensor 111. Step S43 in FIG. 10 may be omitted, and the determination may be made mainly based on the magnitude of the movement amount in step S42. Even when this criterion is used, the effect of reducing the required time by performing the processes in steps S17 to S19 in FIG. 5 can be obtained. However, executing step S43 allows the determination of whether aiming has been established to be made with higher accuracy.

In the embodiment described above, an example was given in which the reading target of the reading device 100 is a code symbol or a character, but the present invention is also applicable to face recognition in which a face is identified. In this case, an image of a human face is captured, and a process of comparing the image with face patterns is performed instead of the decoding process. Even in this case, the function of restarting the reading process 210 according to the result of the aiming state determination process 220, the function of changing the size of the brightness reference region or the method of obtaining the brightness index value and the target brightness index value based on whether aiming has been established, the function of increasing the target level of brightness adjustment if reading fails while aiming has been established, and the function of defining an upper limit of the exposure time or the illumination lighting time according to the movement amount of the imaging sensor 111 produce substantially the same effects as in the above embodiment.

Further, an embodiment of a computer program of the present invention is a computer program for causing one computer or a plurality of computers to cooperate to control required hardware, to realize the functions of the reading device 100 in the embodiment described above, or to execute the processes described in the embodiment above.

Such a computer program may be stored in a ROM or another non-volatile storage medium (flash memory, EEPROM, or the like) originally included in the computer. The program can be provided while being recorded on an arbitrary non-volatile recording medium such as a memory card, a CD, a DVD, a Blu-ray Disc or the like. The computer program can also be downloaded from an external device connected to a network, and installed into and executed by the computer.

Further, the configurations of the above-explained embodiments and modified examples can be embodied in an arbitrary combination unless they are inconsistent with one another and, as a matter of course, can be embodied while taking out only parts of them.

REFERENCE LIST

20*a*, 20*b* . . . image
21 . . . code symbol
22*a*, 22*b* . . . reference point
23, 24 . . . template image
25 . . . search range
41 . . . movement end position
42*a*-42*n* . . . movement vector
43 . . . movement start position
44 . . . allowable range
50*a*, 50*b* . . . image
51, 52 . . . brightness reference region
53 . . . aiming light
60 . . . graph of relative frequency distribution
100 . . . reading device
101 . . . read object
102*a* . . . code symbol
102*b* . . . character string
110 . . . optical unit
111 . . . imaging sensor
112 . . . lens
113 . . . LD
114 . . . pulse LED
120 . . . controller
131 . . . operation unit
132 . . . notifying unit
133 . . . display unit
141 . . . imaging part
142 . . . image acquisition part
143 . . . information reading part
144 . . . output part
145 . . . aiming state determination part
146 . . . reading control part
147 . . . imaging condition setting part
148 . . . exposure time upper limit setting part
201 . . . frame (imaging frame)
210 . . . reading process
211 . . . target analysis process
212 . . . imaging adjustment process
213 . . . filter process
214 . . . object extraction and decoding process
220 . . . aiming state determination process

The invention claimed is:

1. An optical information reading method comprising:

periodically capturing an image by an imager;

analyzing the image captured by the imager to read optical information contained in the image;

estimating, based on images captured within a first time range, an amount of movement of the imager in the first time range;

adjusting an imaging condition of the imager based on pixel values of pixels in the image captured by the imager so that brightness of an image to be obtained in subsequent capturing reaches a predetermined target level; and adjusting the target level to a higher level when the reading of the optical information in the analyzing fails while the estimated amount of movement satisfies a predetermined first upper limit.

2. The optical information reading method according to claim 1, wherein the adjusting of the imaging condition includes calculating a brightness index value based on pixel values of pixels in the image captured by the imager, and adjusting the imaging condition of the imager so that the brightness index value of an image to be obtained in subsequent capturing reaches the target level.

3. The optical information reading method according to claim 2, wherein the adjusting of the imaging condition is adjusting at least one of exposure time and illumination lighting time among imaging conditions of the imager.

4. The optical information reading method according to claim 2, wherein, while the estimated amount of movement satisfies the first upper limit, the brightness index value is defined based on a threshold obtained by classifying pixels sampled from the image captured by the imager into a first class of dark pixels and a second class of bright pixels based on a variance of pixel values of the pixels within each class.

5. The optical information reading method according to claim 4, wherein the classification is performed such that a degree of variance of pixel values of the pixels within each class is minimized.

6. The optical information reading method according to claim 2, wherein, if the estimated amount of movement satisfies the first upper limit, the brightness index value is calculated by a first procedure, and if the estimated amount of movement does not satisfy the first upper limit, the brightness index value is calculated by a second procedure different from the first procedure.

7. The optical information reading method according to claim 6, wherein, for an image that allows the optical information to be read, the brightness index value to be obtained by the first procedure is smaller than the brightness index value to be obtained by the second procedure for the same image.

8. The optical information reading method according to claim 1, wherein the adjusting of the target level includes setting the target level to a predetermined initial value when the estimated amount of movement does not satisfy the first upper limit.

9. The optical information reading method according to claim 1, wherein the adjusting of the target level includes returning the target level to a predetermined initial value when the reading of optical information by the reading fails while the target level is a predetermined upper limit value.

10. The optical information reading method according to claim 1, further comprising:

irradiating an aiming light serving as a reference for directing the imager to optical information to be read; and detecting a position of the aiming light in the image captured by the imager;

wherein the adjusting of the imaging condition is performed such that, when the estimated amount of movement satisfies the first upper limit, the imaging condition of the imager is adjusted based on pixel values of pixels within a predetermined region in vicinity of the detected position of the aiming light in the image captured by the imager.

11. The optical information reading method according to claim 1, further comprising:

irradiating an aiming light serving as a reference for directing the imager to optical information to be read; and detecting a position of the aiming light in the image captured by the imager, wherein the adjusting of the imaging condition is performed such that the imaging condition of the imager is adjusted based on pixel values of pixels around the position of the aiming light in the image captured by the imager, and such that, when the estimated amount of movement satisfies the first upper limit, the imaging condition of the imager is adjusted based on pixel values of pixels within a narrower region around the position of the aiming light as compared with a case where the estimated amount of movement does not satisfy the first upper limit.

12. The optical information reading method according to claim 1, wherein the adjusting of the imaging condition is performed such that the imaging condition of the imager is adjusted based on pixel values of pixels within a predetermined reference region in the image captured by the imager, and such that, when the estimated amount of movement satisfies the first upper limit, the imaging condition of the imager is adjusted based on pixel values of pixels within a narrower region in the image as compared with a case where the estimated amount of movement does not satisfy the first upper limit.

13. An optical information reading device comprising:

an imager;

an imaging controller configured to cause the imager to periodically capture an image;

a reading part configured to analyze the image captured by the imager to read optical information contained in the image;

an estimating part configured to estimate, based on images captured within a first time range, an amount of movement of the imager in the first time range; and a condition adjusting part configured to adjust an imaging condition of the imager based on pixel values of pixels in the image captured by the imager so that brightness of an image to be obtained in subsequent capturing reaches a predetermined target level; and a target level adjusting part configured to adjust the target level to a higher level when the reading of the optical information in the analyzing fails while the estimated amount of movement satisfies a predetermined first upper limit.

14. The optical information reading device according to claim 13, wherein the condition adjusting part is configured to calculate a brightness index value based on pixel values of pixels in the image captured by the imager, and to adjust the imaging condition of the imager so that the brightness index value of an image to be obtained in subsequent capturing reaches the target level.

15. The optical information reading device according to claim 14, wherein the condition adjusting part is configured to adjust at least one of exposure time and illumination lighting time among imaging conditions of the imager.

16. The optical information reading device according to claim 14, wherein the condition adjusting part is configured to define, while the amount of movement estimated by the estimating part satisfies the first upper limit, the brightness index value based on a threshold obtained by classifying pixels sampled from the image captured by the imager into a first class of dark pixels and a second class of bright pixels based on a variance of pixel values of the pixels within each class.

17. The optical information reading device according to claim 16, wherein the classification is performed such that a degree of variance of pixel values of the pixels within each class is minimized.

18. The optical information reading device according to claim 14, wherein the condition adjusting part is configured to calculate, if the amount of movement estimated by the estimating part satisfies the first upper limit, the brightness index value by a first procedure, and to calculate, if the amount of movement estimated by the estimating part does not satisfy the first upper limit, the brightness index value by a second procedure different from the first procedure.

19. The optical information reading device according to claim 18, wherein, for an image that allows the optical information to be read, the brightness index value to be obtained by the first procedure is smaller than the brightness index value to be obtained by the second procedure for the same image.

20. The optical information reading device according to claim 13, wherein the target level adjusting part is configured to set the target level to a predetermined initial value when the amount of movement estimated by the estimating part does not satisfy the first upper limit.

21. The optical information reading device according to claim 13, wherein the target level adjusting part is configured to return the target level to a predetermined initial value when the reading of optical information by the reading part fails while the target level is a predetermined upper limit value.

22. The optical information reading device according to claim 13, further comprising:

an irradiating part configured to irradiate an aiming light serving as a reference for directing the imager to optical information to be read; and a detecting part configured to detect a position of the aiming light in the image captured by the imager;

wherein the condition adjusting part is configured to adjust the imaging condition such that, when the estimated amount of movement satisfies the first upper limit, the imaging condition of the imager is adjusted based on pixel values of pixels within a predetermined region in vicinity of the detected position of the aiming light in the image captured by the imager.

23. The optical information reading device according to claim 13, further comprising:

an irradiating part configured to irradiate an aiming light serving as a reference for directing the imager to optical information to be read; and a detecting part configured to detect a position of the aiming light in the image captured by the imager;

wherein the condition adjusting part is configured to adjust the imaging condition such that the imaging condition of the imager is adjusted based on pixel values of pixels around the position of the aiming light in the image captured by the imager, and such that, when the amount of movement estimated by the estimating part satisfies the first upper limit, the imaging condition of the imager is adjusted based on pixel values of pixels within a narrower region around the position of the aiming light as compared with a case where the estimated amount of movement does not satisfy the first upper limit.

24. The optical information reading device according to claim 13, wherein the condition adjusting part is configured to adjust the imaging condition such that the imaging condition of the imager is adjusted based on pixel values of pixels within a predetermined reference region in the image captured by the imager, and such that, when the amount of movement estimated by the estimating part satisfies the first upper limit, the imaging condition of the imager is adjusted based on pixel values of pixels within a narrower region in the image as compared with a case where the estimated amount of movement does not satisfy the first upper limit.

25. A non-transitory machine-readable storage medium containing program instructions executable by a computer, and when executed, causing one computer or a plurality of computers in cooperation to execute an optical information reading method, the method comprising:

periodically capturing an image by an imager;

analyzing the image captured by the imager to read optical information contained in the image;

estimating, based on images captured within a first time range, an amount of movement of the imager in the first time range;

adjusting an imaging condition of the imager based on pixel values of pixels in the image captured by the imager so as to achieve a predetermined target level of brightness of an image to be obtained in subsequent capturing; and adjusting the target level to a higher level when the reading of the optical information in the analyzing fails while the estimated amount of movement satisfies a predetermined first upper limit.

* * * * *